Figure 1:
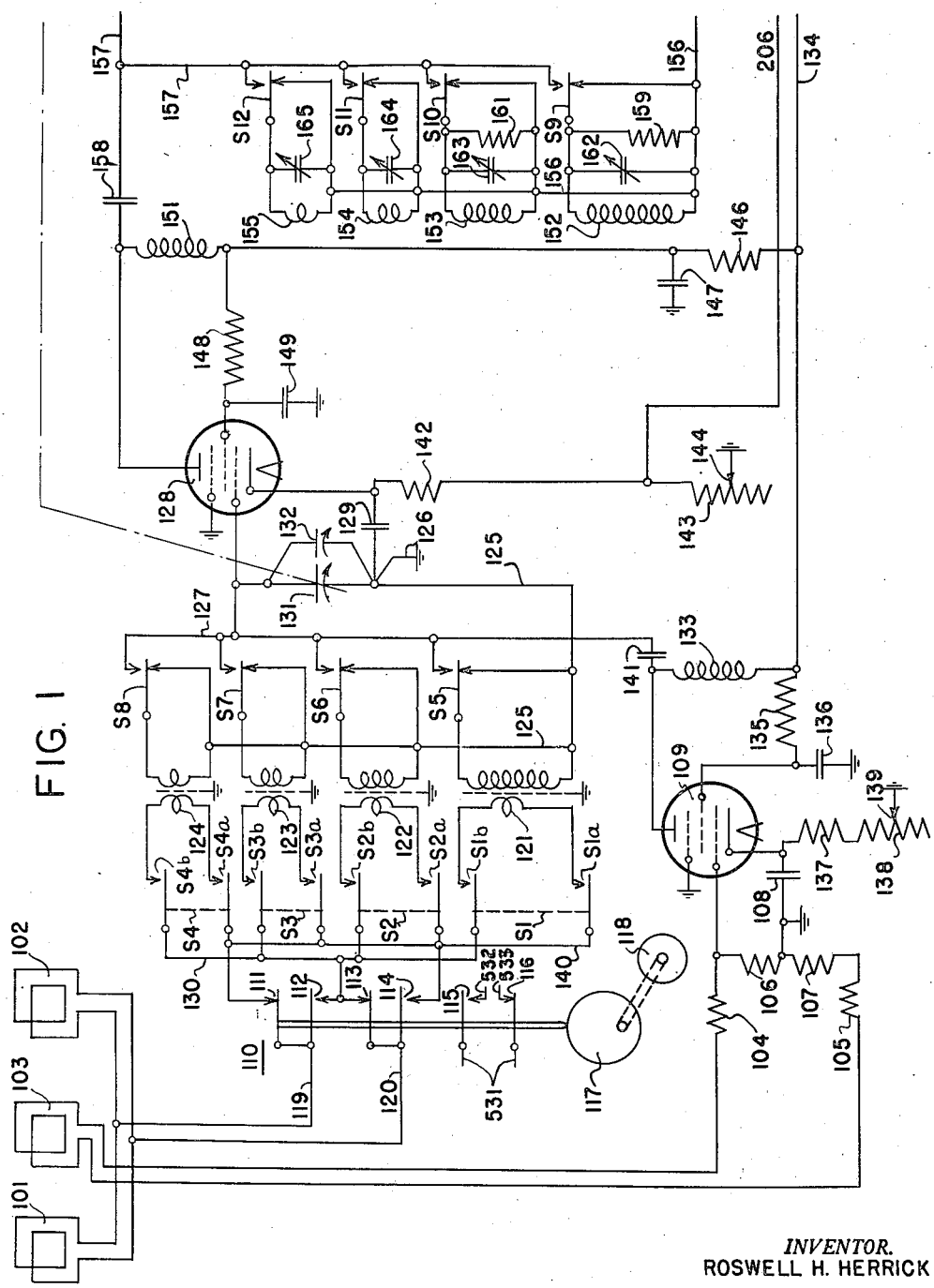
Figure 2:
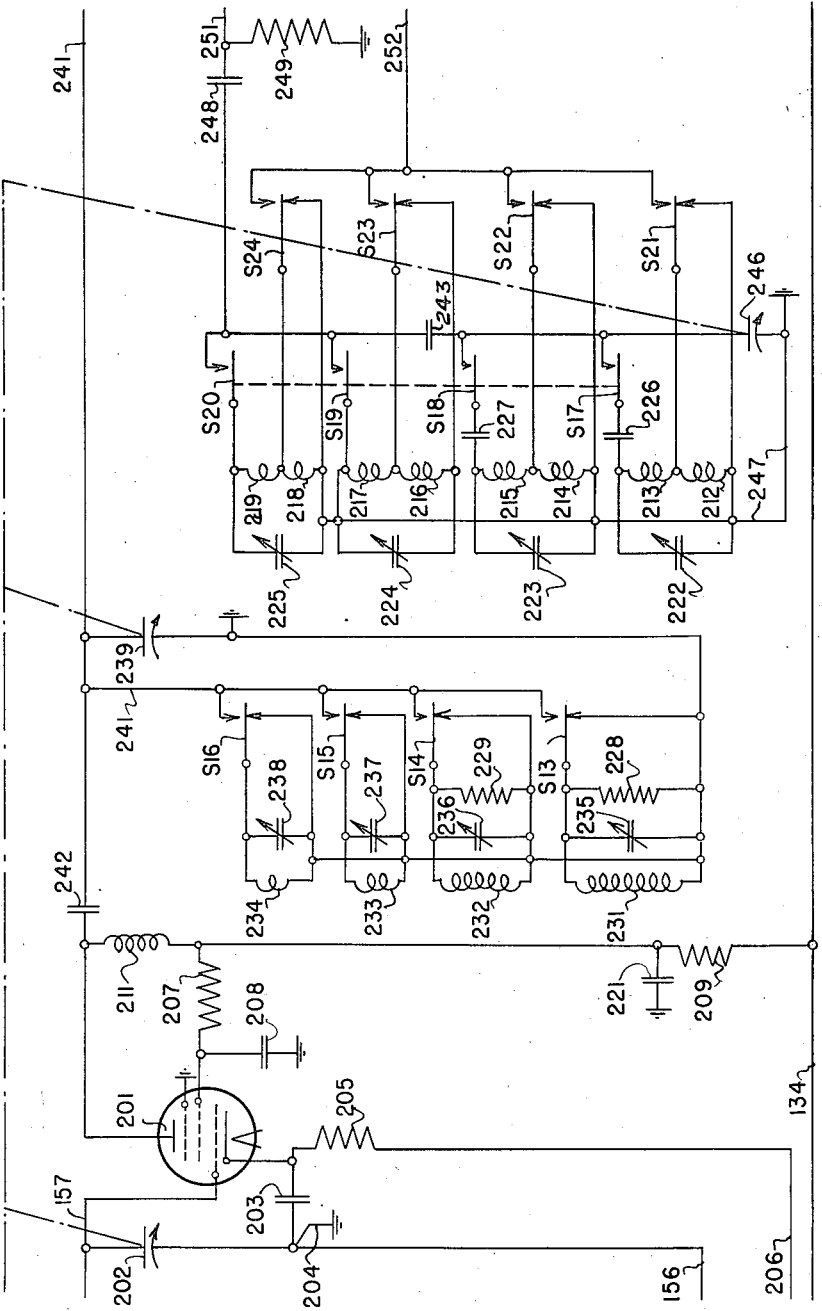
Figure 3:
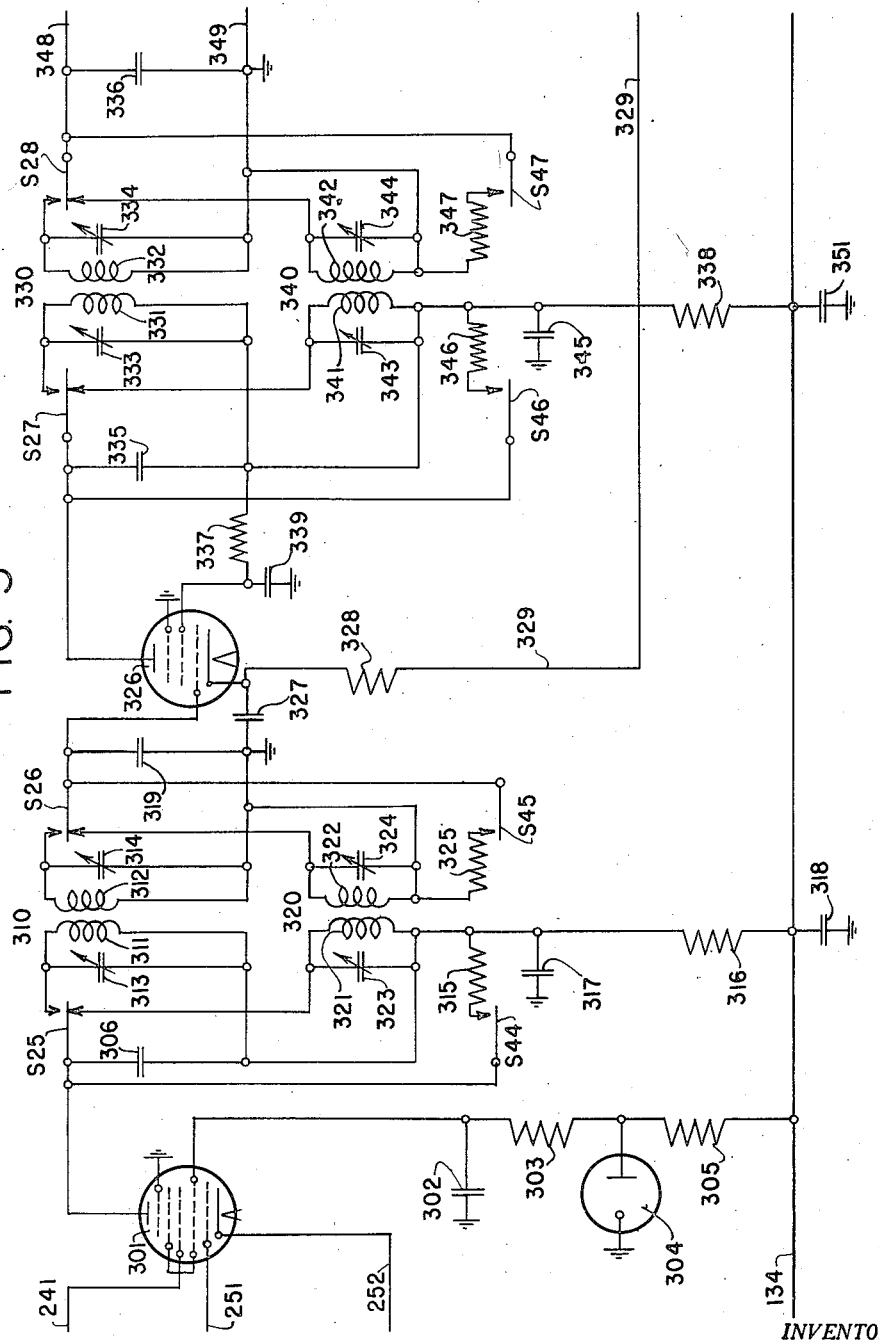
Figure 4:
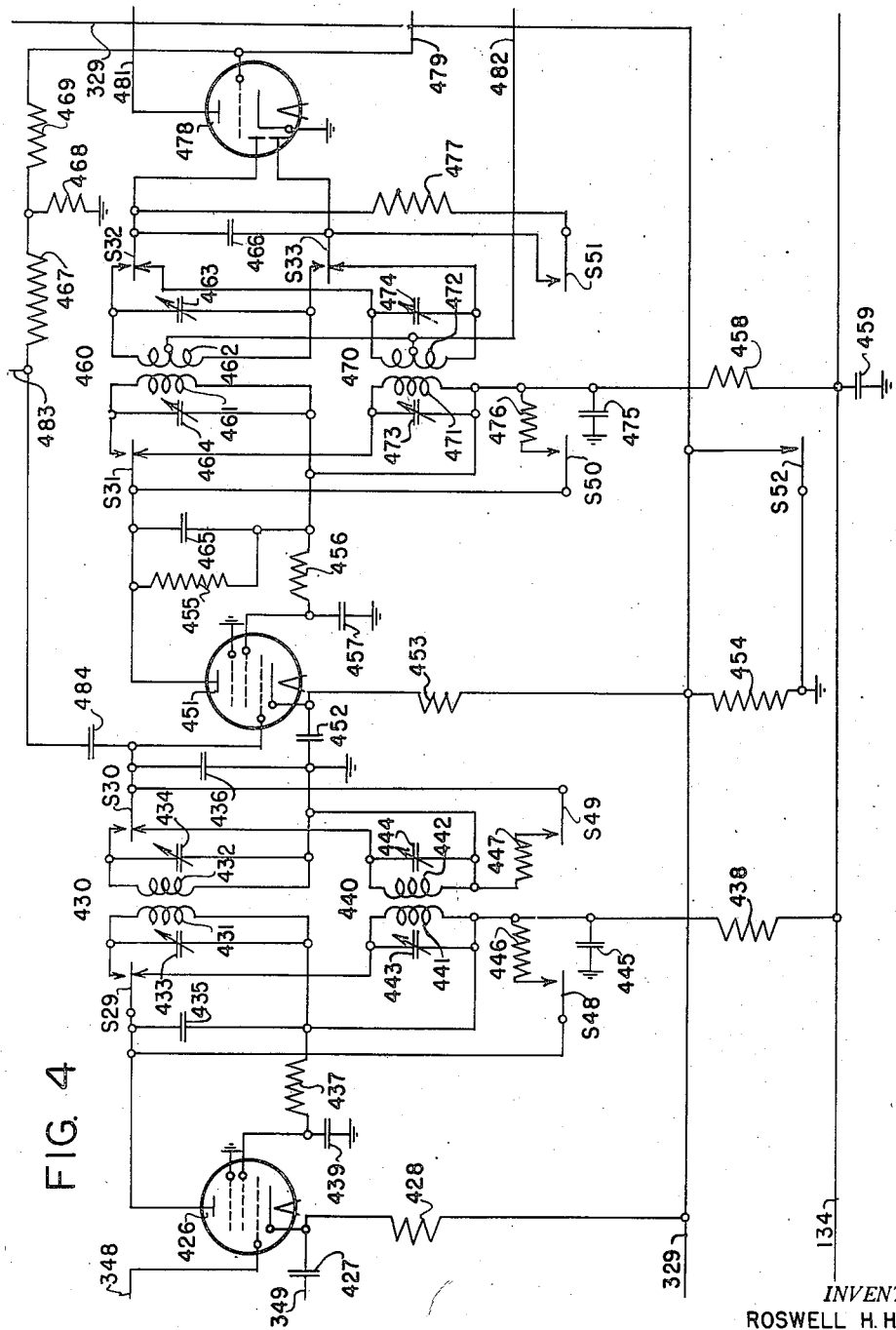
Figure 5:
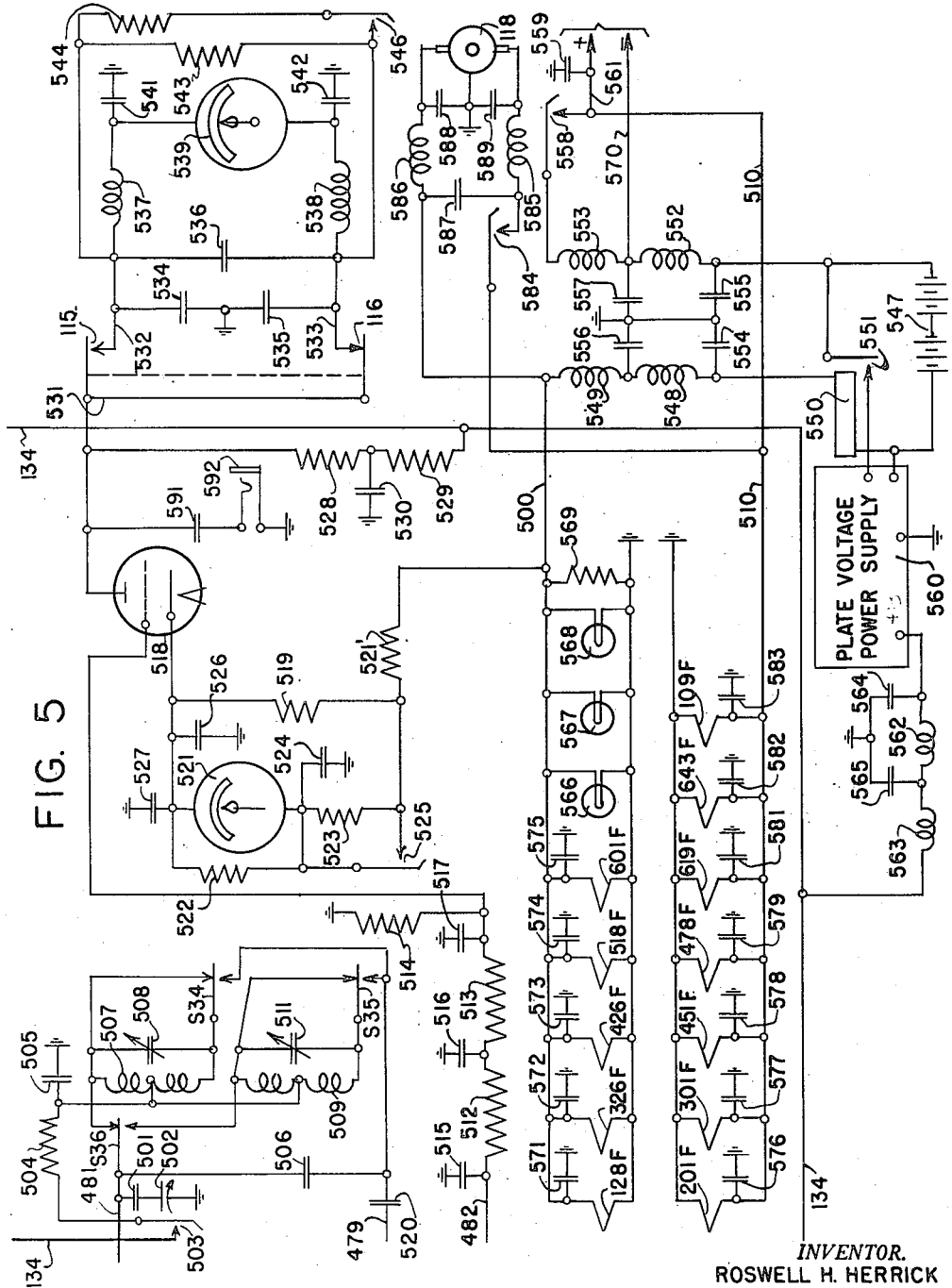
Figure 6:
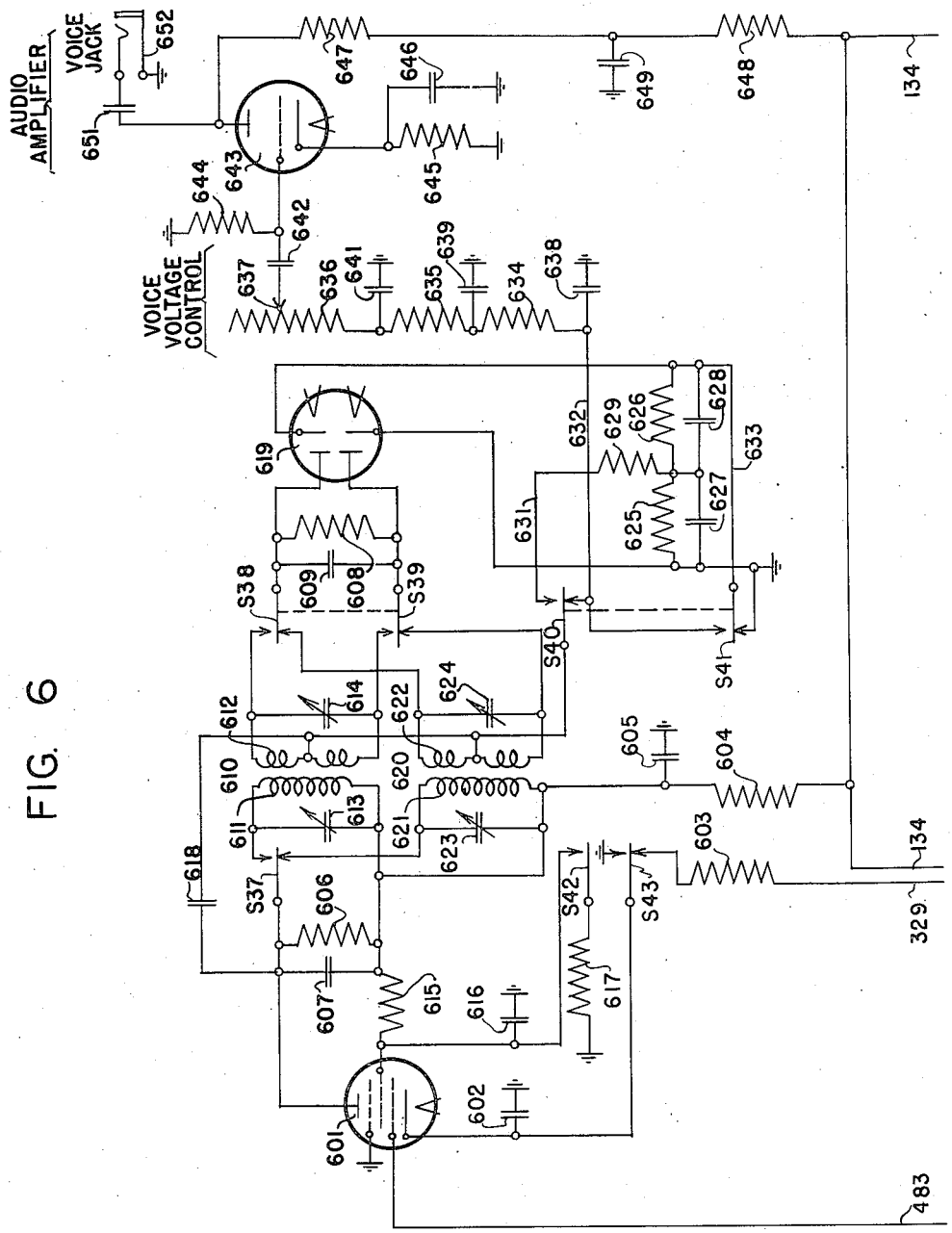

Feb. 22, 1949.　　　　R. H. HERRICK　　　　2,462,188
RADIO DIRECTION FINDER
Filed Oct. 4, 1943　　　　　　　　　　9 Sheets-Sheet 1

*INVENTOR.*
ROSWELL H. HERRICK
BY
Davis, Lindsey, Smith & Shorts
ATTORNEYS

INVENTOR.
ROSWELL H. HERRICK
BY
Davis, Lindsey, Smith & Shonts
ATTORNEYS

INVENTOR.
ROSWELL H. HERRICK
BY
Davis, Lindsey, Smith & Shonts
ATTORNEYS

INVENTOR.
ROSWELL H. HERRICK
BY
Davis, Lindsey, Smith & Shonts
ATTORNEYS

Feb. 22, 1949.    R. H. HERRICK    2,462,188
RADIO DIRECTION FINDER

Filed Oct. 4, 1943    9 Sheets-Sheet 8

*INVENTOR.*
ROSWELL H. HERRICK
*BY*
Davis, Lindsey, Smith & Shonts
ATTORNEYS

Feb. 22, 1949.  R. H. HERRICK  2,462,188
RADIO DIRECTION FINDER
Filed Oct. 4, 1943  9 Sheets-Sheet 9

| | | 1 | 2 | 3 | 4 | 5 | 6 | 7 | 8 | 9 | 10 |
|---|---|---|---|---|---|---|---|---|---|---|---|
| INTERMEDIATE FREQ. RESPONSE | S44 TO S51 INCL. | | X | | X | | X | | | X | |
| INTERMEDIATE FREQ. GAIN | S52 | | X | | X | X | X | X | X | X | X |
| AUDIBLE SIGNAL CHANNEL CONNECTIONS | S42 – S43 SEE NOTE 2 | | X | | X | | X | X | | X | X |
| | S40 – S41 SEE NOTE 1 | | X | | X | | X | X | | X | X |
| B.F.O STARTS WITH CLOSING OF SW. 503 | S34 TO S36 | 34 | | 34 | | 35-36 | | | 35-36 | | |
| INTERMEDIATE FREQUENCY AMPLIFIER | S25 TO S33 AND S37, S38 & S39 | | | | | X | X | X | X | X | X |
| FIRST DETECTOR | S17 & S21 | X | X | | | | | | | | |
| | S18 & S22 | | | X | X | | | | | | |
| | S19 & S23 | | | | | X | X | X | | | |
| | S20 & S24 | | | | | | | | X | X | X |
| RADIO FREQUENCY AMPLIFIER | S1, S5, S9, S13 | X | X | | | | | | | | |
| | S2, S6, S10, S314. | | | X | X | | | | | | |
| | S3, S7, S11, S15 | | | | | X | X | X | | | |
| | S4, S8, S12, S16. | | | | | | | | X | X | X |
| | BAND FREQUENCY COVERAGE AM – FM | 2 TO 3 MC AM | 2 TO 3 MC FM 15 | 3 TO 4.5 MC AM | 3 TO 4.5 MC FM 15 | 20 TO 31 MC AM | 20 TO 31 MC FM 15 | 20 TO 31 MC FM 75 | 31 TO 50 MC AM | 31 TO 50 MC FM 15 | 31 TO 50 MC FM 75 |
| | BAND SWITCH POSITIONS | 1 | 2 | 3 | 4 | 5 | 6 | 7 | 8 | 9 | 10 |

NOTES
1 – S40 & S41 DETERMINE CONNECTION OF TUBE 619 AS FULL WAVE DIODE DETECTOR FOR CONTINUOUS WAVE OR AMPLITUDE MODULATED SIGNALS OR AS A FREQUENCY DISCRIMINATOR.

2 – S42 & S43 DETERMINE CONNECTION OF TUBE 601 AS AN INTERMEDIATE AMPLIFIER FOR CONTINUOUS WAVE OR AMPLITUDE MODULATED SIGNALS OR AS A FREQUENCY MODULATION LIMITER.

FIG. 16

INVENTOR.
ROSWELL H. HERRICK
BY
Davis, Lindsey, Smith & Shonts
ATTORNEYS

Patented Feb. 22, 1949

2,462,188

UNITED STATES PATENT OFFICE 2,462,188

RADIO DIRECTION FINDER

Roswell H. Herrick, Oak Park, Ill., assignor to Automatic Electric Laboratories, Inc., Chicago, Ill., a corporation of Delaware Application October 4, 1943, Serial No. 504,985

21 Claims. (Cl. 343—120)

The present invention relates to radio direction finders and, more particularly, to a radio direction finder suitable for operation in several of the higher radio frequency bands wherein amplitude modulated, frequency modulated, and continuous wave signals are to be received.

Heretofore various types of radio direction finders have been devised which range from the simple single loop antenna radio receiver to the more complicated systems such as the Bellinni-tosi and the Adcock. The simple single vertical loop antenna has as its predominant disadvantage its susceptibility to distortion due to "night effect." "Night effect" is the term applied to the distortion introduced in the response pattern of the antenna due to induced voltages appearing at the output of the antenna which result in a false indication of the null position. Vertically polarized waves traveling parallel with the plane of the loop antenna, irrespective of the angle of elevation of the direction of travel of such waves, produce maximum response at the loop antenna output terminals. Vertically polarized waves traveling toward the plane of the loop antenna, irrespective of the angle of elevation of the direction of travel of such waves, produce no response at the loop antenna output terminals. A horizontally polarized wave traveling horizontally produces no response at the antenna output terminals. A horizontally polarized wave traveling with an angle of elevation of the direction of travel of such waves produces maximum response when traveling toward the plane of the loop antenna. Such horizontally polarized waves traveling non-horizontally are produced by reflections from the Ionosphere or Kennelly-Heaviside layer. At night the reflection angles are greater, thus these waves produce a greater response in the loop antenna and are termed "night effect." This response is maximum at the null position for vertically polarized waves travelling toward the plane of the loop and hence a different null position will be indicated.

The single loop antenna has two null positions so that it is not possible to determine the direction of a transmitter but merely the plane in which a transmitter is located. In order to obviate this a non-directional antenna or sense antenna has been used in conjunction with a single loop antenna to produce a polar response diagram in the form of a cardioid. Thus a single null position is obtained but the cardioid is subject to the "night effects" and hence the null position is subject to error.

The Bellinni-Tosi system was developed at a time when amplification of received energies was not as highly developed as at present, and it had for its advantage the absence of the necessity of rotating the large massive loop antenna. Subsequently the Adcock system was developed in order to obviate the "night effect." The Adcock system with stationary antennas produced a clover-leaf response pattern which, however, introduces the disadvantage of providing four null indications so that a ninety degree ambiguity might be introduced with respect to the plane in which a transmitter is operating. It thus becomes apparent that the problem of providing a radio direction finder is not a simple one, and that for a given set of conditions it is perhaps best to provide a particular solution rather than to attempt to obtain an ideal universal direction finding system.

Accordingly, certain of these conditions will now be considered. In the present instance it was deemed desirable to provide a radio direction finder of the portable type which would operate over several relatively high radio frequency ranges and which could be used for direction finding of transmitters which may emit amplitude modulated, frequency modulated, or continuous wave signals. A primary requirement was the elimination of the "night effect" and the ninety degree ambiguity such as is inherent in the spaced loop system. The direction finding system should provide for audible identification of the transmitting station and a reliable, sensitive, error free visual indication of the plane in which the transmitter and receiver are located.

In accordance with the present invention these primary requirements were met by utilizing a pair of spaced parallel opposed loop antennas together with a sense antenna in the form of a loop antenna located midway between and parallel to the spaced parallel loop antennas, to eliminate the "night effect." All of the loop antennas are maintained balanced with respect to ground. A minimum number of switches are employed to provide a phase reversal when combining the energies of the spaced parellel loop antennas with the sense loop antenna. Means are provided for controlling the ratio of the energies so combined so as to avoid overload effects and mistuning of the receiver. It has been observed that this combination of antennas has an inherent advantage in that the ratio of the energies so combined is not critical and that variations in phase relation may occur without introducing appreciable error in the null indication.

In order to maintain the receiver apparatus and the operation thereof as simple as possible the sense loop antenna was provided with a resistive termination from which energy was obtained by an amplifying tube having an aperiodic input circuit. The output circuit of this tube is of the aperiodic impedance-capacitance coupled type, thereby to avoid the requirement of a tuning capacitor together with a plurality of different impedances which otherwise would be required for each of the frequency bands over which the receiver is supposed to operate. The spaced loop antennas were connected through suitable reversing switches to a selected one of a plurality of tuned input transformers each of which was provided with shielding means for electrostatically balancing the primary winding with respect to ground. In order that there be no interaction between the selected transformer and those transformers not in use, each of the secondary windings of the unused transformers is normally short circuited. The input circuit of the amplifying tube associated with these input transformers is capacitively coupled to the plate circuit of the sense antenna amplifying tube. The sense antenna amplifying tube is provided with a manually operable gain control whereby the ratios of the energies combined may be controlled.

The present direction finder is arranged for operation over two high frequency radio frequency ranges, as, for example, the range of 2 to 4½ megacycles and the range of 20 to 50 megacycles. It is desired to receive both narrow and wide band modulated signals such as amplitude modulated and frequency modulated signals in addition to continuous wave signals. At the higher frequency range of 20 to 50 megacycles a narrow response characteristic is desired for the reception of continuous wave and amplitude modulated signals, and a deviation of plus or minus 75 kilocycles is desired for the reception of frequency modulated signals. Accordingly, the present receiver utilizes a plurality of stages of radio frequency amplification of the impedance-capacitance tuned-input-impedance type. In order that the wide band modulation encountered by frequency modulation might be properly amplified by a radio frequency amplifier, the lower frequency range impedances are given a broadened response characteristic by the introduction of resistors in shunt to the input impedance coils. Normally each of a plurality of tuned-input-impedance coils for the different frequency bands is short-circuited and switching means are provided for removing the short circuit from a desired one of the impedances and for connecting such impedance to the input electrode of its associated amplifier tube.

Because of the great difference between the two frequency ranges to be received the intermediate frequency amplifier is arranged to operate at two different intermediate frequencies such as 456 kilocycles and 5 megacycles. Each stage of intermediate frequency amplification therefore is provided with two intermediate frequency transformers, the primary and secondary windings of which are provided with adjustable trimmer capacitors arranged to operate parallel with a fixed loading capacitor. In the frequency range of 2 to 4.5 megacycles it is desired to provide a broadened response of the intermediate frequency amplifier for a plus or minus 15 kilocycle deviation for the reception of frequency modulated signals. Each stage of amplification is provided with a pair of resistors adapted to be switched in circuit to provide this broadened response characteristic. In addition, at the higher frequency range of 20 to 50 megacycles a broadened response characteristic of plus or minus 75 kilocycle deviation is provided for frequency modulated signals. By provision of suitable switching arrangements these same resistors are again utilized to broaden the response of the intermediate frequency amplifier for these signals. Whenever frequency modulated signals are being amplified by the intermediate frequency amplifier the gain of the amplifier is increased by reducing the grid bias a predetermined amount. This change in bias is controlled by the same switching arrangement which connects into circuit the response broadening resistors. The first detector and oscillator tube is provided with a plurality of tuned impedances which normally have one half of their windings short circuited so as to prevent any interaction between the impedance being used and those not being used.

Since the radio receiver is to operate over the frequency ranges of 2 to 4.5 megacycles and 20 to 50 megacycles, it has been found desirable to divide each range into two bands. Thus the radio frequency amplifier stages and the first detector oscillator are each provided with four transformers or impedances which are arranged to be switched into circuit by suitable switching means. This switching means also controls the selection of the transformers to be used in the intermediate frequency amplifier.

The intermediate frequency amplifier is arranged to energize two separate channels. The one channel provides for the audible signals so that the station might be readily identified. The other channel converts signal energy into proportional direct current impulses to produce visual indication of the orientation of the directional antennas with respect to the transmitter, the signals of which are being received. This visual indication is obtained by a circuit arrangement wherein two capacitors each are charged by different direct currents obtained in accordance with different combinations of antenna voltages. A zero-center direct current instrument is connected across the two capacitors to give an indication of the resultant direct current voltage appearing across the capacitors. In order that the indicating instrument be deadbeat a resistor and an alternating current electrolytic capacitor are connected in shunt to the indicating instrument. This circuit arrangement therefore provides an indication which bears a relation to the reversal of phase of one of the antenna voltages, since the detector which is used to convert the radio frequency energies into proportional direct current energies is not effective to discriminate between phase relations of alternating currents.

In order to provide for the reception of continuous wave signals without requiring the use of an additional vacuum tube in the receiver, the detector in the visual indication circuit has a triode section which is used for the generation of oscillations to provide audibility to the continuous wave signals. This oscillator is coupled to the input of the audible signal channel which, for continuous wave signals and amplitude modulated signals, comprises a stage of intermediate frequency amplification, a detector, and a stage of amplification. For the reception of frequency modulated signals the intermediate stage of amplification in this channel is converted into a frequency modulation limiter. The detector at the same time is converted into a frequency modulation discriminator. These changes are accomplished by suitable circuit elements operated by a switching means which control the frequency bands to be received by the receiver.

It is, therefore, an object of the present invention to provide an improved radio direction finder wherein "night effect" has been eliminated.

Another object of the present invention is to provide an improved radio direction finder wherein "night effect" has been eliminated and which obviates ninety degree ambiguities.

Another object of the present invention is to provide an improved radio direction finder utilizing a pair of spaced loop antennas and a sense loop antenna wherein each of the antennas is maintained balanced with respect to ground.

Another object of the present invention is to provide an improved radio direction finder utilizing a plurality of loop antennas and a sense loop antenna which has a minimum of tuning apparatus.

Another object of the invention is to provide an improved radio direction finder utilizing spaced loop antennas and a sense antenna which with a minimum of switches provides for the periodic reversal of phase when the energies of the antennas are combined.

It is another object of this invention to provide an improved radio direction finder whereby the plane in which the radio transmitter and the direction finder are located is indicated while the directional antennas are positioned so as to be influenced to the maximum extent by the waves of the radio transmitter.

A further object of invention is to provide an improved radio direction finder in which the energies of several directional antennas are combined and, in accordance with the combined energies, a visual response indication is provided which is substantially unaffected by minor phase variations of the energies so combined.

A further object of invention is to provide an improved radio direction finder which produces a visual response indication of sharply defined nulls.

A still further object of invention is to provide an improved radio receiver for operation at several of the higher radio frequency ranges.

A still further object of invention is to provide an improved superheterodyne radio receiver for operation at the higher radio frequency ranges to receive amplitude modulated, frequency modulated, and continuous wave signals.

A still further object of invention is to provide in a radio receiver an intermediate frequency amplifier selectively operable at two different intermediate frequencies.

A still further object of invention is to provide in a superheterodyne radio receiver an intermediate frequency amplifier operable at two different intermediate frequencies with a common means for broadening the response characteristic of the amplifier at either of the intermediate frequencies.

A still further object of invention is to provide in a radio receiver an intermediate frequency amplifier for the reception of narrow band and wide band modulated signals with means for increasing the gain of said amplifier for the reception of the wide band modulated signals.

Another and further object of the present invention is to provide a circuit for comparing direct currents wherein a direct current instrument is damped so as to be deadbeat.

Other and further objects of the present invention will become more readily apparent by reference to the following description taken in connection with the accompanying drawings wherein Figs. 1 to 6 comprise a circuit diagram of the radio direction finder comprising the present invention; Figs. 7 to 15 are graphical representations and curves to explain the operation of the present invention; and Fig. 16 is a chart showing certain switching operations performed in accordance with different receiving conditions.

Referring more particularly to Figs. 1 to 6, it will be seen that a plurality of directional antennas has been provided. A pair of loop antennas 101 and 102 are arranged in spaced parallel relation and the connections thereto are so arranged that the voltages in the antennas are opposed so that a resultant voltage is obtained at the output terminals of these two antennas. A third directional loop antenna 103 is positioned midway between and parallel to the pair of loop antennas 101 and 102. The loop antenna 103 serves as a sense antenna so that energy therefrom might be combined with the resultant energy obtained from the pair of spaced opposed antennas, whereby a response may be obtained by the radio receiver which, translated by an indicating circuit, will show the null position of the directional antennas. The manner in which the voltages are obtained and the resultant indication is obtained will subsequently be explained after the radio receiver has been described in detail.

In order to simplify the radio receiver apparatus and at the same time to obviate as far as possible the introduction of unbalances in any of the antennas with respect to ground, a minimum of switches and tuning apparatus is employed. The sense antenna 103 is provided with a resistive termination comprising the resistor network composed of the resistors 104 to 107. The midpoint of this resistor network is connected to ground. A portion of the voltage appearing across the resistive termination of the loop antenna 103 is applied to a vacuum tube 109 by a direct connection between the control grid thereof with one terminal of the resistor 106 and by a coupling capacitor 108 connected between the cathode of the vacuum tube 109 and the intermediate terminal of the resistor network. It therefore becomes apparent that the input to the vacuum tube 109 is aperiodic and that for all frequency ranges and tuning bands no individual impedance transformers or tuning apparatus is employed.

The spaced parallel loop antennas 101 and 102 are connected together so as to produce a resultant voltage across a pair of conductors 119 and 120 which are connected to certain switch contacts on a motor driven switch 110. This switch is provided with a plurality of make and break contacts 111 to 116. The contacts 111 to 114 are so arranged with respect to the loop antenna conductors 119 and 120 as to comprise a double pole double throw switch, whereby the phase of the spaced loop antenna energy may be reversed. The remaining switch contacts 115 and 116 are arranged to interconnect a pair of conductors 531 with conductors 532 and 533 to provide with respect to the operation of the double pole double throw switch portion of the switch 110, concomitant operation corresponding to single pole double throw switch operation. This latter switching operation interconnects a direct current indicating circuit with that portion of the receiver which produces direct currents proportional to the combined energies fed to the input of the radio receiver. The motor driven switch 110 is provided with a plurality of cams 117 so that the switch contacts 111 and 113 are made simultaneously while the switch contacts 112 and 114 are opened, and vice versa. The switch contacts 115 and 116 are arranged to complete a circuit to one of the conductors 532 or 533 subsequent to the operation of the previously mentioned switch contacts and prior to the subsequent operation of the contacts. This difference in timing is provided so as to insure that there will be no error in the value of the direct current voltages applied to the indicating circuit.

The cams 117 are driven by a suitable direct current motor 118. The switch contacts 112 and 113 are connected to a conductor 130 which joins the lower contact of each of a plurality of switch contacts S1b, S2b, S3b and S4b. The switch contacts 111 and 114 are connected by the conductor 140 to the lower contacts of a plurality of switch contacts S1a, S2a, S3a and S4a. A plurality of switches S1, S2, S3 and S4, each composed of pairs of switch contacts S1a, S1b, etc., are arranged for selective connection to the primary windings of a plurality of different input transformers 121 to 124, respectively. Two transformers 121 and 122 are provided for the two bands which comprise the first range of frequencies from 2 to 4.5 megacycles, and two other transformers 123 and 124 are provided for the two bands in the other range of frequency from 20 to 50 megacycles. Each of the transformers 121 to 124 is balanced with respect to ground by the provision of an electrostatic shield interposed between the primary and secondary windings.

The switch 110 which interconnects the spaced loop antennas 101 and 102 with the balanced to ground input radio frequency transformer is constructed so as to be symmetrical in all respects to avoid introducing any unbalances in the antenna circuit. While the switch has been used between the spaced loop antennas and the radio frequency input transformers in order to reverse the phase of one of the energies being combined in the first stage of amplification of the radio rceiver, it of course will be appreciated by those skilled in the art that the switch migh have been arranged to reverse the phase of the energy supplied by the sense loop antenna 103, in which case the switch 110 would interconnect the sense loop antenna 103 with the input to the vacuum tube 109.

One terminal of each of the secondary windings of the transformers 121 to 124 is connected to a conductor 125 which, in turn, is connected to the grounded terminal 126 of a main tuning capacitor 131 and a vernier tuning capacitor 132. The other terminals of the secondary windings of the transformers 121 to 124 are connected respectively to switches S5 to S8 which normally are arranged to short circuit the secondary windings of these transformers. By suitable switch operating apparatus any selected one of these switches may be actuated so as to cause the selected transformer terminal to be connected to the conductor 127 which is connected to the grid electrode of a vacuum tube 128. The cathode of the vacuum tube 128 is connected through a fixed biasing resistor 142 and an adjustable biasing resistor 143 provided with an adjustable contact 144 connected to ground. The common connection between the resistors 142 and 143 is also connected to a conductor 206. The cathode of the vacuum tube 128 is connected to a by-pass capacitor 129 which, in turn, is connected to ground. The output circuit of the vacuum tube 128 includes a choke coil 151 and a voltage drop resistor 146 which, in turn, is connected to a conductor 134 which serves to supply a high potential for the anodes and the screen grids of the various vacuum tubes. The common juncture between the resistor 146 and the choke coil 151 is connected to a by-pass capacitor 147 which is grounded. This common juncture is also connected to a current drop resistor 148 which is connected to the screen grid of the vacuum tube 128. The screen grid of the vacuum tube 128 is connected to a grounded by-pass capacitor 149. The vacuum tube 128 therefore is provided with an input circuit which may be tuned so as to resonate at a desired frequency within any one of the four bands of frequencies covered by the input transformers 121 to 124. The vacuum tube 128 by means of the transformers 121 to 124 receives the resultant energy obtained from the opposed spaced parallel loops 101 and 102. This energy, the phase of which is periodically reversed by the operation of the switch 110, is combined with energy received from the vacuum tube 109.

The vacuum tube 109 is provided with an output circuit which includes an anode choke coil 133 connected between the high voltage conductor 134 and the anode of the vacuum tube 109. The anode of the vacuum tube 109 is capacitively coupled to the input circuit of vacuum tube 128 by a coupling capacitor 141 connected to the conductor 127. Suitable voltage is supplied to the screen grid electrode of the vacuum tube 109 by means of a voltage drop resistor 135 connected between the conductor 134 and the screen grid. The screen grid of the vacuum tube 109 is connected to a grounded by-pass capacitor 136. Because the plate or anode of the vacuum tube 109 is capacitively coupled to the tuned input circuit of the vacuum tube 128, the vacuum tube 109 in fact utilizes this tuned circuit as its plate load and, hence, the tuned input circuit of the vacuum tube 128 serves as a mixing circuit for the voltages of the spaced parallel opposed loop antennas and the voltage component obtained from the sense loop antenna.

The anode of the vacuum tube 128 is coupled by a capacitor 158 to the grid of the next radio frequency amplifying tube 201 which is connected to the conductor 157. The conductor 157 is connected to the upper contact of each of a plurality of switches S9, S10, S11 and S12 which normally are arranged to short circuit a plurality of tuned impedances 152 to 155, each of which is provided with an auxiliary tuning capacitor 162 to 165, respectively. The auxiliary or trimmer tuning capacitors 162 to 165 each operate in parallel to the main tuning capacitor 202 which is connected between the grid of the vacuum tube 201 and a ground connection 204 which is also connected to a conductor 156. The conductor 156 joins one terminal of each of the tuned impedances 152 to 155. In order that the lower frequency tuned impedances 152 and 153 might have response characteristics sufficiently broad to accommodate the reception of wide band or frequency modulated signals these impedances have been shunted by resistors 159 and 161, respectively. The cathode of the vacuum tube 201 is provided with a grounded by-pass capacitor 203. The cathode of the vacuum tube 201, furthermore, is connected through a biasing resistor 205 and the adjustable biasing resistor 143 to ground. It thus becomes apparent that the vacuum tube 128 is provided with a predetermined self bias from the resistor 142, and similarly the vacuum tube 201 is provided with a predetermined self bias from the resistor 205, and these biases are augmented by the common bias provided by the drop through the resistor 143. The adjustable contact 144 on the resistor 143 is arranged to be actuated from the operating panel of the radio receiver so as to comprise a manually operable gain or sensitivity control for the radio frequency amplifier. The output circuit of the vacuum tube 201 includes a choke coil or impedance 211 and a voltage drop resistor 209 connected between the anode and the high voltage conductor 134. The resistor 209 is provided with a grounded by-pass capacitor 221. A lesser voltage is applied to the screen grid of the vacuum tube 201 by means of a voltage drop resistor 207 connected between the screen grid of the vacuum tube 201 and the common juncture of the resistor 209 and the choke coil 211. The screen grid of the vacuum tube 201 is by-passed to ground through a by-pass capacitor 208. The output of the vacuum tube 201 is coupled by a capacitor 242 to the input electrode of the next vacuum tube 301 by means of a conductor 241.

The grid of the vacuum tube 301 is connected to a tuning capacitor 239, the rotor of which is grounded. The conductor 241 is connected to the upper contact of each of a plurality of switches S13 to S16 arranged for cooperation with a plurality of tuned impedances 231 to 234. The switches S13 and S16 are arranged so that the tuned impedances when not in use are short circuited. One terminal of each of the tuned impedances 231 to 234 is connected to the ground. Auxiliary tuning or trimmer capacitors 235 to 238 are arranged in parallel to the tuned impedances 231 to 234. The lower frequency tuned impedances 231 and 232 are provided with shunt resistors 228 and 229 in order that their response characteristic might be broadened sufficiently for the transmission of wide band or frequency modulated signals in those frequency bands.

The vacuum tube 301 serves as a combined oscillator and first detector and, accordingly, an oscillator circuit is provided which is connected to the conductors 251 and 252 which are joined to the grid and cathode of this vacuum tube. The grid which is connected to the conductor 251 is connected through a resistor 249 to ground and is capacitively coupled to oscillation circuit by a capacitor 248 connected to the upper contacts of switches S19 and S20. These upper contacts of the switches S19 and S20 are coupled by a padding capacitor 243 to the upper contacts of a pair of switches S17 and S18 and to one terminal of a grounded tuning capacitor 246. A plurality of impedances 212 to 219 are arranged for cooperation with a plurality of adjustable trimmer capacitors 222 to 225. The impedances 212 and 213 are joined together to form a series circuit across the capacitor 222. The common juncture of the impedances 212 and 213 is connected to one terminal of a break-make switch S21. The switch S21 is arranged so as to normally short circuit one of these impedances, such as the choke coil or impedance 212. One terminal of the other impedance or choke 213 is connected through a padding capacitor 226 to one of the contacts of a switch S17. The remaining choke impedances 214 to 219 are similarly grouped together so that the choke impedances 214 and 215 are connected across the trimmer capacitor 223, the choke impedances 216 and 217 are connected across the capacitor 224, and choke impedances 218 and 219 are connected across the capacitor 225. Similarly arranged switches S22, S23 and S24 are arranged so as to normally short circuit the choke impedances 214, 216 and 218. One terminal of the choke impedance 215 is connected through a padding capacitor 227 to one contact of the switch S18. Each of the circuits therefore comprises a tuned oscillating circuit which may be placed in operation by the simultaneous operation of its two associated switches. The tuning capacitor 246 is common to all of these circuits and is arranged for adjustment by a unitary drive means interconnecting the tuning capacitors 239, 202 and 131. The vacuum tube 301 is provided with a screen grid which is connected through resistors 303 and 305 to the anode voltage conductor 134. This grid is by-passed to ground by a grounded capacitor 302. The voltage supplied to the screen grid is stabilized by the connection of a voltage regulator tube 304 between ground and the common juncture of the resistors 303 and 305.

The output of the vacuum tube 301 is connected to a multi-stage intermediate frequency amplifier which is arranged to operate at either of two selected intermediate frequencies, dependent upon which of the frequency ranges is being utilized in the radio frequency amplifier.

The anode of the vacuum tube 301 is connected through a switch S25 and a primary winding 321 of a transformer 320 and a voltage drop resistor 316 to the anode voltage conductor 134. The juncture of the resistor 316 with the voltage conductor 134 is connected to a grounded by-pass capacitor 318. The other terminal of the resistor 316 is connected to a grounded by-pass capacitor 317. The transformer 320 has a primary winding 321 and a secondary winding 322 which recpectively are provided with shunt trimmer capacitors 323 and 324. The trimmer capacitor 323 is arranged for operation in parallel with a fixed loading capacitor 306 to tune the primary winding 321. The secondary winding of the transformer 320 is connected to ground and to one contact of a switch S26. The switch S26 is connected to the input grid electrode of a vacuum tube 326. The trimmer capacitor 324 of the secondary winding 322 of the transformer 320 is arranged to operate in parallel with a fixed loading capacitor 319 to tune the transformer secondary winding 322. The switches S25 and S26 normally are in the position shown so that the transformer 320 is effective for the operation of the intermediate frequency amplifier at a frequency of 456 kilocycles. This frequently is used when reception is had in the frequency range of 2 to 4.5 megacycles. When the reception is in the frequency range of 20 to 50 megacycles the switches S25 and S26 are actuated to connect into circuit another intermediate frequency transformer 310 which is arranged to operate at an intermediate frequency of 5000 kilocycles. The intermediate frequency transformer 310 is provided with a primary winding 311 and a secondary winding 312 which are connected in parallel with trimmer capacitors 313 and 314 respectively. The capacitors 313 and 314 are each arranged to operate in parallel with loading capacitors 306 and 319 respectively to tune the primary and the secondary windings of the transformer 310. The cathode of the vacuum tube 326 is connected through a voltage drop resistor 328 to a conductor 329. The resistor 328 is provided with a grounded by-pass capacitor 327.

When the intermediate frequency transformer 320 is connected as shown the response characteristic thereof is not sufficiently broad for proper transmission of wide band or frequency modulated signals. In order to broaden the response characteristic of this transformer a resistor 315 is connected in shunt to the primary winding 321 by a switch S44, and another resistor 325 is connected in shunt to the secondary winding 322 by a switch S45. When the other intermediate frequency transformer 310 is used the response characteristic thereof adequately passes wide band modulated signals having a deviation of plus or minus 15 kilocycles. When, however, a deviation of plus or minus 75 kilocycles is desired, it is necessary to broaden the response characteristic of this transformer 310. To accomplish this the resistors 315 and 325 are connected by the switches S44 and S45 in parallel with the primary and secondary windings respectively of the intermediate frequency transformer 310. Thus it becomes apparent that a single pair of resistors associated with a stage of intermediate frequency amplification serves to broaden the frequency response of either of two intermediate frequency transformers. The effect of the resistors 315 and 325, of course, is much greater on the intermediate frequency transformer 310 which operates at the higher intermediate frequency of 5000 kilocycles, and hence there is provided a broadened response characteristic for the transmission of modulation signals having a deviation of plus or minus 75 kilocycles.

The anode of the vacuum tube 326 is normally connected through a switch S27 and the primary winding 341 of an intermediate frequency transformer 340 and the voltage drop resistor 338 to the anode voltage conductor 134. The juncture of the resistor 338 with the voltage conductor 134 is connected to a grounded by-pass capacitor 351. The other terminal of the resistor 338 is connected to a grounded by-pass capacitor 345. The juncture between the resistor 338 and the primary winding 341 of the transformer 340 is connected through a voltage drop resistor 337 to a screen grid of the vacuum tube 326 which is connected to a grounded by-pass capacitor 339. The intermediate frequency transformer 340 has its primary winding 341 and its secondary winding 342 tuned by trimmer capacitors 343 and 344, respectively, connected in parallel with fixed capacitors 335 and 336.

Another intermediate frequency transformer 330 is provided with a primary winding 331 and a secondary winding 332 tuned by trimmer capacitors 333 and 334, respectively, in parallel with the fixed capacitors 335 and 336. The transformer 330 is arranged to be switched into operation by the actuation of switches S27 and S28. The switch S28 is connected to a conductor 348 which is connected to the grid or input electrode of a vacuum tube 426. One terminal of each of the secondary windings 332 and 342 is connected to a grounded conductor 349 which is connected to one terminal of a capacitor 427, the other terminal of which is connected to the cathode of the vacuum tube 426. A pair of resistors 346 and 347 are arranged to be connected by a pair of switches S46 and S47 in parallel with the primary and secondary windings of either of the transformers 330 or 340 in order to broaden the response characteristic thereof.

The vacuum tube 426 has its cathode connected through a voltage drop resistor 428 to a conductor 329. The anode of the vacuum tube 426 is normally connected through a switch S29 to the primary winding 441 of the transformer 440 and through a resistor 438 to the voltage conductor 134. The common juncture between the resistor 438 and the primary winding 441 of the intermediate transformer 440 is connected to a resistor 437 which is connected to the screen grid of the vacuum tube 426. The screen grid of the vacuum tube 426 is connected to a grounded by-pass capacitor 439. The primary winding 441 of the transformer 440 is arranged to be tuned by a trimmer capacitor 443 which operates in parallel with a fixed loading capacitor 435. The secondary winding 442 of the intermediate frequency transformer is tuned by a trimmer capacitor 444 arranged to operate in parallel with a fixed loading capacitor 436. The intermediate frequency transformer 440 is normally connected in circuit by the switches S29 and S30 to provide operation at the lower of the two intermediate frequencies.

An intermediate frequency transformer 430 is provided for operation at the higher intermediate frequencies. The primary winding 431 of the transformer 430 is tuned by a trimmer capacitor 433 and operating in parallel with a fixed loading capacitor 435. The secondary winding 432 of this transformer is tuned by a trimmer capacitor 434 operating in parallel with a fixed loading capacitor 436. In order that either of the intermediate transformers 430 or 440 may have their response characteristic broadened, there is provided a pair of resistors 446 and 447 which are arranged to be connected in parallel to the primary and secondary windings, respectively, by a pair of switches S48 and S49. The secondary windings of the intermediate frequency transformers 430 and 440 have the one terminal grounded and the other terminal arranged to be connected by operation of the switch S30 to the grid or input electrode of the vacuum tube 451. The grid of the vacuum tube 451 is connected to a capacitor 484 so that a portion of the energy appearing across the input circuit of the vacuum tube 451 may be transmitted to another signal channel energized from a conductor 483. The cathode of the vacuum tube 451 is connected through a biasing resistor 453 to the conductor 329. The resistor 453 is by-passed to ground by a capacitor 452 connected to the cathode of the vacuum tube 451. The conductor 329 also extends to a stage of intermediate frequency amplification energized from the conductor 483. The conductor 329 is connected through a resistor 454 to ground. Thus the resistors 328, 428 and 453 together with the resistor 454 operate to provide a certain predetermined bias to the intermediate frequency amplifier thus far described. For the reception of certain signals, such as the frequency modulated signals, it is desirable to increase the gain of the intermediate frequency amplifier by a predetermined amount, and to thus change the bias there is provided a switch S52 which is arranged to short circuit the voltage drop resistor 454, thereby to increase the gain of the amplifier.

The visual indication channel includes two intermediate frequency transformers 460 and 470. The anode of the last amplifier tube of the previously described intermediate frequency amplifier has its anode normally connected through the switch S31 to the primary winding 471 of the intermediate transformer 470 and through a resistor 458 to the high voltage conductor 134. The juncture of the resistor 458 with the high voltage conductor is connected to a grounded bypass capacitor 459. The other terminal of the resistor 458 is connected to a grounded by-pass capacitor 475. The primary winding 471 of the transformer 470 is arranged to be tuned by a trimmer capacitor 473 operating in parallel with a fixed loading capacitor 465. The response characteristic of the intermediate frequency transformer is broadened slightly by a connection of the resistor 455 in parallel with the fixed capacitor 465. Voltage is supplied to the screen grid of the vacuum tube 451 through a voltage drop resistor 456 and the screen grid is connected to a grounded by-pass capacitor 457. The secondary winding 472 of the transformer 470 is tuned by a trimmer capacitor 474 operating in parallel with a fixed loading capacitor 466 connected between the diode elements of a vacuum tube 478. The secondary winding 472 is normally connected by the switches S32 and S33 to these diode elements. When the switches S31 to S33 are actuated the other intermediate frequency transformer 460 is connected into circuit. The primary winding 461 together with its trimmer capacitor 464 are now connected in shunt to the fixed loading capacitor 465. The secondary winding 462 and its trimmer capacitor 463 are connected in parallel with the fixed loading capacitor 466. The secondary windings 462 and 472 are each provided with a midtap which is connected to a conductor 482, whereby the unidirectional current produced by the full wave rectifier action of the diode elements of the vacuum tube 478 is transmitted through a suitable filter to a stage of direct current amplification. In order that the response characteristics of the intermediate frequency transformers 460 and 470 may be broadened further for the transmission of wide band or frequency modulated signals there are provided resistors 476 and 477 arranged to be connected by switches S50 and S51, respectively, across the primary and secondary windings of the intermediate frequency transformer then in use.

The vacuum tube 478 is of the type having two diode elements and a triode element. The cathode of the vacuum tube is connected to ground. The grid of the vacuum tube 478 is connected to an isolating capacitor 529 which is connected to one terminal of a fixed padding capacitor 506 and one contact of each of the switches S34 and S35. The anode of the vacuum tube 478 is connected to the conductor 481 which is connected to one terminal of a blocking capacitor 501, the other terminal of capacitor 506, and one contact of a switch S36. The capacitor 501 is connected in a series circuit extending from the conductor 481 through a variable tuning capacitor 502 to ground to prevent the application of high voltage to the latter capacitor. At the extreme counter-clockwise position of the rotor of the capacitor 502 a switch 503 is actuated to the open-circuit position shown. The switch 503 is connected in series between the high voltage conductor 134 and a resistor 504 which is connected to the midpoints of tuned inductors 507 and 509. The juncture between the resistor 504 and the tuned inductors 507 and 509 is connected to a grounded by-pass capacitor 505. The inductor 507 is provided with an adjustable capacitor 508, and similarly the inductor 509 is provided with an adjustable capacitor 511. These capacitors 508 and 511 operate in parallel with the loading capacitor 506. The switch S34 normally is arranged to short circuit the inductor 507. The switch S35 is arranged to normally short circuit the other inductor 509. Normally the upper terminal of the inductor 507 is connected through the switch S36 to the conductor 481 which is connected to the anode of the vacuum tube 478. In order to determine the frequency of the oscillator for the first range of signal frequencies being received the switch S34 is actuated to place into operation the resonant circuit comprising the inductor 507, the parallel capacitors 508 and 506, and the series connected capacitors 501 and 502. In order to provide the proper frequency of oscillation for the upper range of signal frequencies to be received the switch S34 remains in the position shown in the circuit and the switches S35 and S36 are actuated to place the other resonant circuit into operation. Energy from the oscillating circuit is transmitted through a resistor network including the resistors 467 and 469 connected to conductor 483 and a grounded resistor 468 connected to the common juncture of the resistors 467 and 469. The oscillator is placed into operation by rotation of the rotor of the capacitor 502 which closes the switch 503 thereby to supply anode energy to a circuit including the resistor 504, a portion of the inductor 507, and the conductor 481. The frequency of the oscillator within certain predetermined limits is varied by operation of the variable capacitor 502.

The direct current produced by the diode section of the vacuum tube 478 is transmitted by the conductor 482 through a resistor filter network including the series connected resistors 512 and 513. The juncture between the first resistor 512 and the conductor 482 is connected to a grounded capacitor 515. The juncture between the two resistors is connected to a grounded capacitor 516. The remaining terminal of the resistor 513 is connected to a grounded capacitor 517. The juncture between the resistor 513 and the capacitor 517 is connected directly to the grid of a direct current amplifier vacuum tube 518 and to a grid circuit coupling resistor 514 which is grounded. The cathode of the vacuum tube 518 is connected through resistors 519 and 521' to the cathode filament 518F, one side of which is grounded. The cathode of the vacuum tube 518 is by-passed to ground by an electrolytic capacitor 526. A zero-center direct current indicating or tuning meter 521 connected in parallel to a resistor 522 and in series with a resistor 523 is arranged across the resistor 519. In order to vary the sensitivity of the meter 521 there is provided a switch 525 arranged to short circuit the series resistor 523. In order that any radio frequency energy which might enter through the glass on the face of the instrument 521, which is mounted on the front of the completely shielded cabinet, might not be permitted to pass to other parts of the receiver, each side of the meter 521 is by-passed to ground by one of two grounded capacitors 524 and 527. The anode of the vacuum tube 518 is supplied with voltage from the conductor 134 through the series resistors 528 and 529, the common juncture of which is by-passed to ground through the grounded capacitor 530.

In order to provide for a test of the operativeness of the visual indicating channel there is provided a coupling capacitor 591 connected between the anode of the vacuum tube 518 and a jack 592 which is connected to ground. A plug and head phones may be connected to the jack in order to test the receiver and this channel to determine whether the operation is proper.

The anode of the vacuum tube 518 is also connected to the conductor 531 which is connected to the switch contacts 115 and 116 of the motor driven switch 110. The remaining contacts of the pairs of switch contacts 115 and 116 are connected to the conductors 532 and 533 respectively, which are connected through radio frequency choke coils 537 and 538 to opposite terminals of the zero center direct current indicating instrument 539. A pair of capacitors 534 and 535 are connected between the conductors 532 and 533, and their common juncture is grounded. Since only one of these capacitors at any one time is connected between ground and the conductors 531, only the connected capacitor is therefore charged by the direct current supplied to the conductors 531. The operation of the switch contacts 115 and 116 is concomitant with the periodic reversal of phase of one of the radio frequency energies being combined at the input of the receiver by virtue of the operation of the double pole double throw portion of the motor driven switch 110. Thus when the combination of energies of the loop antennas 101 and 102 together with the sense antenna 103 is transmitted through the receiver, converted by the diode portion of the vacuum tube 478 and amplified by the vacuum tube 518, this direct current is supplied to one of the capacitors 534 or 535. When, however, the energies from the spaced parallel opposed antennas and the sense antenna are combined with reverse phase relation the corresponding direct current produced by the vacuum tube 478 and amplified by the vacuum tube 518 is supplied to the other of the two capacitors. The meter 539 is responsive to the difference in voltage between the capacitors 534 and 535. In order that the meter 539 give a steady indication, or in other words be deadbeat, there is provided an alternating current electrolytic capacitor 536 connected between the conductors 532 and 533. A resistor 543 is connected in parallel to the alternating current electrolytic capacitor 536 so as to control the sensitivity of the indicating meter 539 and to provide a discharge circuit for the capacitors. The sensitivity of the meter 539 furthermore may be varied by connecting a resistor 544 in parallel with the resistor 543 by operation of a switch 546. The radio frequency choke coils 537 and 538 serve to prevent any radio frequency energy from being fed back into the receiver which might enter into the indicating instrument 539 through the glass dial, since the instrument is mounted in the front of an otherwise completely shielded cabinet. In order to dissipate such radio frequency energy each terminal of the indicating instrument 539 is by-passed to ground by grounded capacitors 541 and 542.

The entire radio receiver is energized from two six-volt storage batteries 547 connected in series. One terminal of these batteries is connected through filter choke coils 552 and 553 to a power switch 558. The other side of the power switch 558 is connected to a conductor 510 which extends to a number of filaments of the vacuum tubes. The same terminal of the storage batteries 547 is also connected to one contact of a pair of contacts 551 of a relay 550. The relay 550 is connected in series between the other terminal of the batteries 547 and a plurality of choke coils 548 and 549 which are connected to conductor 500 which supplies energy to another group of filaments of vacuum tubes and several dial lights. A pair of capacitors 554 and 555 arranged in series is connected across the relay 550 and the batteries 547. The common juncture of these capacitors is connected to ground. Between the common juncture of the choke coils 552 and 553 and the choke coils 548 and 549 also are connected a pair of series-connected capacitors 556 and 557, the common juncture of which also is grounded. One side of the power switch 558 is connected to a conductor 561 which, in turn, is connected to a grounded capacitor 559. The common juncture between the choke inductors 552 and 553 is connected to a conductor 570. The conductors 561 and 570 are provided for the energization of such auxiliary equipment as may be needed in connection with the operation of the direction finder. Such equipment, for example, may comprise a remote indicating or telemetric system for indicating at a remote point the azimuth of the directional antennas 101 and 102. Such apparatus, for example, is shown, claimed and described in the copending applications of Edward S. Peterson, Serial No. 501,956, filed September 11, 1943, now Patent No. 2,411,389, granted November 19, 1946, and Serial No. 501,957, filed September 11, 1932, now Patent No. 2,427,621, granted September 16, 1947. When the power switch 558 is closed, energy flows through the relay 550 causing it to close its contacts 551. This completes a circuit from the storage batteries 547 to a plate voltage supply apparatus 560. The output of the plate voltage power supply 560, which may be of any desired type including a vibrator rectifier power pack, is transmitted through a filter circuit including the series choke coils 562 and 563 and grounded filter capacitors 564 and 565 to the high voltage conductor 134.

At the same time that the switch 558 is closed energy now flows out over the conductors 500 and 510 to supply energy to the filaments of the various vacuum tubes and to certain dial lights. For example, the conductor 510 may be connected to one side of a plurality of filaments such as 201F, 301F, 451F, 478F, 619F, 643F and 109F. One side of each of these filaments is connected to ground and the other side of each of these filaments is suitably by-passed to ground by capacitors 576, 577, 578, 579, 581, 582 and 583, respectively. The conductor 500 is connected to the filaments of various vacuum tubes such as the filaments 128F, 326F, 426F, 518F and 601F which have one side thereof connected to ground. The other side of each of these filaments is suitably by-passed to ground through capacitors 571 to 575, respectively. A plurality of dial lights 566 to 568 are also connected between ground and the conductor 500. In order that the currents supplied by both conductors 500 and 510 might be equal a balancing resistor 569 is connected between ground and the conductor 500. It will be noted that the batteries 547 have a common juncture which is not directly connected to ground but which is effectively connected to ground through the grounded sides of the various filaments associated with the power conductors 500 and 510. It furthermore will be remembered that the cathode circuit of the vacuum tube 518 includes the filament 518F which is grounded, so that a six volt positive bias is supplied to the grid circuit of the direct current amplifier tube 518. This has the effect of placing weak signal direct current voltages of the full wave detector 478 on the linear portion of the tube characteristic of the direct current amplifier tube 518. Thus correct proportional amplification is provided for weak signals so as to avoid errors which otherwise might be introduced due to tube noises because of the high overall gain of the radio receiver required due to the low energy level obtained by the use of loop antennas.

The intermediate frequency amplifier transformer 430 or 440 is capacitively coupled by the capacitor 484 to the conductor 483 which extends to the control grid of an intermediate frequency amplifying tube 601. Normally the vacuum tube 601 operates as an intermediate frequency amplifying tube in the audible signal channel portion of the radio receiver. The cathode of the vacuum tube 601 is connected to a grounded bypass capacitor 602 and through the normally closed switch S43 to a resistor 603 which is connected to the conductor 329 which extends to the resistor 454 to ground. Since the resistor 454 is arranged to be short circuited by operation of the switch S52, it becomes apparent that the bias on the vacuum tube 601 is also changed at the same time that the bias on the intermediate frequency amplifier tubes 326, 426 and 451 is changed. When the audible signal channel is to receive frequency modulated signals the operation of the vacuum tube 601 is changed to a frequency modulation limiter. This changeover is accomplished by operation of switches S42 and S43, the latter switch therefor operating to connect the cathode of the vacuum tube 601 directly to ground when it is to operate as a frequency modulation limiter.

The vacuum tube 601 is arranged to operate at either of the two intermediate frequencies at which the first intermediate frequency amplifying tubes operate, and for this purpose there are provided two intermediate frequency transformers 610 and 620. Normally the one terminal of the primary winding 621 of the intermediate frequency transformer 620 is connected through the switch S37 to the anode of the vacuum tube 601. The other terminal of the primary winding 621 of the transformer 620 is connected through a voltage drop resistor 604 to the high voltage conductor 134. The connection between the resistor 604 and the primary winding 621 is also connected to a grounded by-pass capacitor 605. The primary winding 621 is arranged to be tuned by an adjustable capacitor 623 arranged to operate in parallel with loading capacitor 607. The secondary winding 622 of the transformer 620 is normally connected through switches S38 and S39 to the rectifier plates of a full wave restifier tube 619. The secondary winding 622 of the transformer 620 is arranged to be tuned by an adjustable capacitor 624 operating in parallel with another loading capacitor 609. In order to broaden the response characteristic of the transformers 610 and 620 there is provided for the primary windings a resistor 606 connected in parallel to the loading capacitor 607, and for the secondary windings, a resistor 608 connected in parallel with the loading capacitor 609. The secondary winding 622 of the transformer 620 is provided with a midtap which for amplitude modulated, and continuous wave signals is connected by a switch S40 to a conductor 632. The midpoint of this intermediate frequency transformer secondary winding 622 is also connected to a phasing capacitor 618 which is connected to the anode of the vacuum tube 601 for operation when frequency modulated signals are being received. For the reception of frequency modulated signals the switch S40 joins the midpoint of the intermediate frequency transformer winding 622 to the conductor 631.

For operation at the other intermediate frequency, the transformer 610 has a primary winding 611 arranged to be tuned by an adjustable capacitor 613 arranged to operate in parallel with the loading capacitor 607. The secondary winding 612 of the transformer 610 is tuned by an adjustable capacitor 614 arranged to operate in parallel with the loading capacitor 609. The resistors 606 and 608 are arranged for broadening the response of either of the transformers 610 or 620, dependent upon the condition of operation of the switches S37 to S39. The midpoint of the secondary winding 612 of the intermediate frequency transformer 610 is connected to the switch S40 and to the phasing capacitor 618.

When the switches S40 to S43, inclusive, are in the positions shown, the vacuum tube 601 operates as a final stage of intermediate frequency amplification which has a broader response characteristic than the previous stages of intermediate frequency amplification. Suitable screen grid voltage is supplied from the voltage conductor 134 through the resistor 604 and another resistor 615 which is connected to the screen grid of the vacuum tube 601. The screen grid of the vacuum tube 601 is also connected to a grounded by-pass capacitor 616 and to the switch S42. The switch S42 is connected through a resistor 617 to ground. When the operation of the vacuum tube 601 is altered for the reception of frequency modulated signals the switch S43 grounds the cathode of the vacuum tube, thereby to remove the bias heretofore appearing in the grid to cathode circuit of the tube. At the same time the potential applied to the screen grid of this vacuum tube 601 is altered by the closing of the switch S42, which now forms a voltage divider circuit between ground and the voltage conductor 134 and which includes the resistors 617, 615 and 604 in series. It is believed that such change in the operation of the vacuum tube 601 will be readily understood by those skilled in the art as the operation in the form of a limiter corresponds to the operation already known in the art.

The outputs of the intermediate frequency transformers 610 or 620 are arranged to energize the plate electrodes of the full wave rectifying tube 619. The cathodes of the vacuum tube 619 are connected to ground, one directly to ground and the other by the operation of the switch S41 for the reception of continuous wave or amplitude modulated signals. Under such operation the audible signal components produced by the vacuum tube 619 appear in the secondary windings of the intermediate frequency transformers which, it will be recalled, are normally connected through the switch S40 to the conductor 632, which is connected to a resistor capacitor filter network comprising the resistors 634, 635 and 636, the latter resistor being provided with an adjustable contact 637. The junctures between the conductor 632 and the various resistors are each connected to one of a plurality of grounded capacitors 638, 639 and 641. The adjustable contact 637 on the resistor 636 is connected to a coupling capacitor 642 which is connected to the grid of the audio amplifier tube 643. The grid of this vacuum tube is provided with a grounded grid resistor 644. The cathode of the vacuum tube 643 is suitably biased by a grounded resistor 645 which is by-passed by a capacitor 646. The output circuit of the vacuum tube 643 includes a coupling resistor 647 connected between the anode and the voltage drop resistor 648. The juncture between these two resistors is connected to a grounded by-pass capacitor 649. The voltage drop resistor 648 is connected to the high voltage conductor 134. The anode of the vacuum tube 643 is connected to a blocking capacitor 651 which, in turn, is connected to the grounded jack 652 provided for the reception of a phone plug connected to a pair of head phones.

In order to receive frequency modulated waves there is provided a combination of resistors and capacitors connected between the two cathodes of the vacuum tube 619. Resistors 625 and 626 are connected between the two cathodes and the common juncture between the resistors is connected through a resistor 629 to the conductor 631 which is connected to one contact of the switch S40. A capacitor 627 is connected cross the resistor 625 and another capacitor 628 is connected across the resistor 626. One cathode of the vacuum tube 619 is connected directly to ground. The other cathode of the vacuum tube 619 is connected to the conductor 633 so that when the switch S41 is in the position shown it is connected to ground, but when the switch S41 is actuated for the reception of frequency modulated waves the conductor 633 is connected to the conductor 632 which, in turn, is connected to the resistance capacitance filter arrangement preceding the input to the amplifying tube 643. For frequency modulation reception, therefore, the midpoint of the secondary winding of the intermediate frequency transformer is connected to the resistor 629. Due to the change in the connections to the cathodes of the vacuum tube 619 when the switches S40 and S41 are operated, the two rectifier portions of the vacuum tube 619 function as differentially arranged detectors operated from a single intermediate frequency amplifier or limiter. Since this circuit operation corresponds to discriminators or frequency detectors already known in the art no further explanation of the operation thereof is deemed to be necessary.

Figure 7:
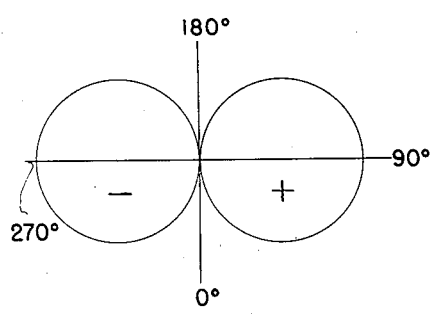

In a single vertical loop antenna a vertically polarized wave traveling horizontally and parallel with the plane of the loop induces therein a voltage which appears at the terminals of the loop. As the loop is rotated with respect to such horizontally traveling vertically polarized waves the voltage appearing at the terminals of the loop will decrease until the plane of the loop is perpendicular to the direction of travel of such waves. As the loop then is at right angles to the wave no voltage appears at the output terminals. The loop antenna may then continue to be rotated until it has been moved through an arc of one hundred and eighty degrees, whereupon a maximum amount of voltage will again appear at the output terminals. A further rotation of the loop through ninety degrees reduces the output voltage to zero and a subsequent rotation again increases the output voltage to a maximum. Direction finding loop antennas are usually provided with an azimuth scale of three hundred and sixty degrees and the voltage response obtained by the rotation of the loop antenna with respect to vertically polarized horizontally traveling waves may be plotted in polar co-ordinates so that the resultant voltage represented with respect to the angular displacement or azimuth of the loop forms a figure eight pattern, such as shown in Fig. 7. The voltage obtained when the loop is at the ninety degree position of Fig. 7 is maximum and when the loop is at two hundred and seventy degrees it is also maximum but of opposite phase, and hence it has been common to represent one of the circles of the figure eight as positive and the other circle as negative to indicate this phase change.

Figure 8:
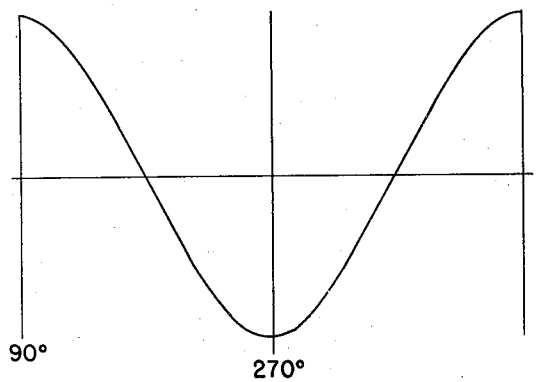
Figure 9:
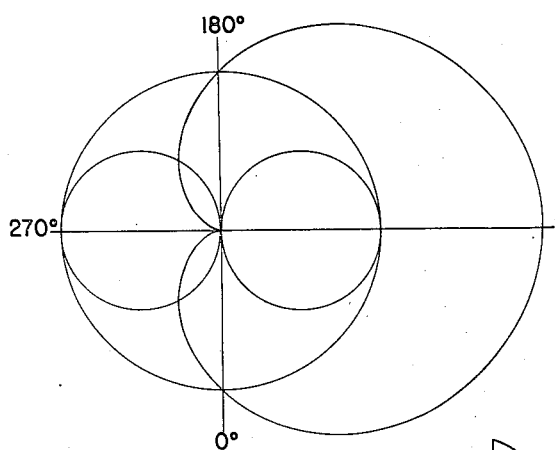

The voltages induced in the loop antenna, however, may also be represented by linear co-ordinates as shown in Fig. 8. The single loop antenna shows the greatest change in induced voltage at the zero and one hundred eighty degree positions of Figs. 7 and 8 and hence these points are better suited for determining the direction of a radio transmitter than would be the maximum voltage points at ninety degrees or at two hundred and seventy degrees. The minimum points are therefore known as true and reciprocal null points. A single loop antenna, however, is subject to a distortion or displacement of the null points by horizontally polarized waves traveling in a non-horizontal direction as is the case of a wave reflected from the Kennelly-Heaviside layer, which error has been called the "night effect." A single figure loop, therefore, indicates the plane in which the transmitter and the receiver are located but does not indicate the direction from the receiver to the transmitter and, hence, this is termed to be a one hundred and eighty degree ambiguity of this directional antenna system.

Figure 10:
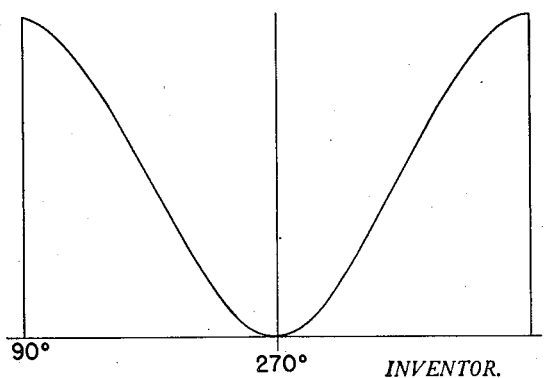
Figure 11:
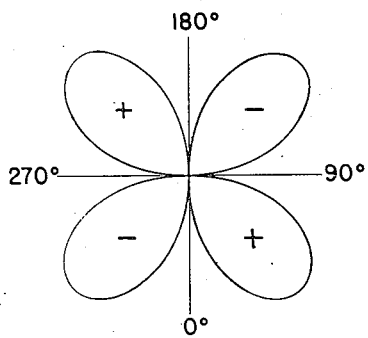

In order to avoid one hundred and eighty degree ambiguity it has been proposed to combine the outputs of a loop antenna with a non-directional antenna, the polar diagram of which may be represented as being a circle. The combination of these two voltages therefore produces a response pattern such as the cardioid shown in Fig. 9 which has but one null position. The cardioid of Fig. 9, however, still has an erroneous null position due to the "night effect" upon the loop antenna. The response of such antenna system may also be plotted in linear co-ordinates as shown in Fig. 10.

In order to obviate "night effect" directional antenna systems such as the Adcock system or the spaced loop antenna system have been suggested. The response pattern of such antenna systems is commonly termed a clover-leaf and this has been shown in Fig. 11. Translated into linear coordinates, the representation would appear as a sinusoidal curve shown in Fig. 12. The spaced loop system, however, while having the advantage of the elimination of "night effect" has the great disadvantage of having four null positions which are referred to as ninety degree ambiguities.

Figure 12:
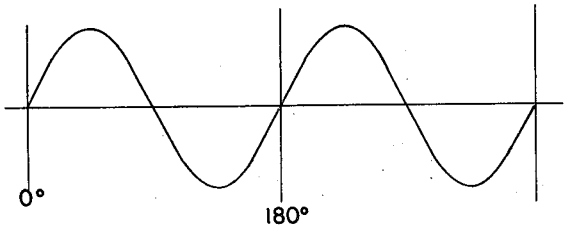

In order to obtain the benefits of a system wherein the "night effect" has been eliminated, the present invention combines the output of a spaced loop antenna arrangement with another loop antenna known as a sense loop antenna. The spaced loop antenna has a response characteristic such as shown in Fig. 12 and this is also shown by the curve A of Fig. 13. The voltage of the spaced loop antennas shown by the curve A is combined with the voltage obtained from the single intermediate loop antenna, which is shown by the curve B which is similar to the curve shown in Fig. 8 but displaced by an angle of ninety degrees.

Figure 13:
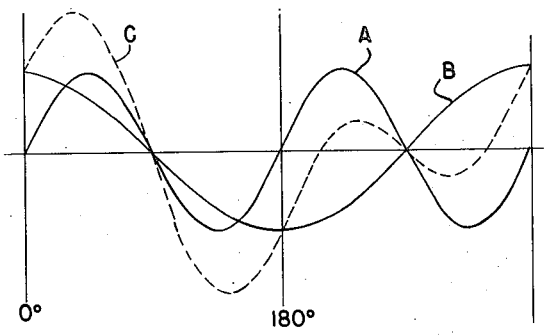
Figure 14:
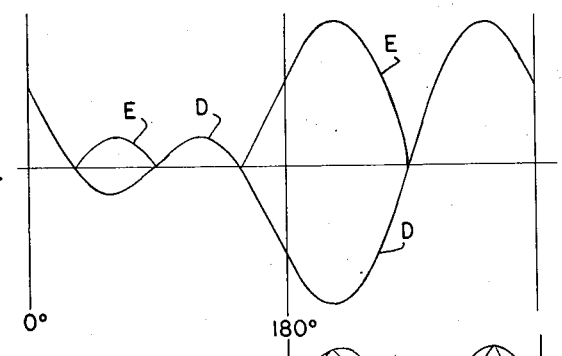
Figure 15:
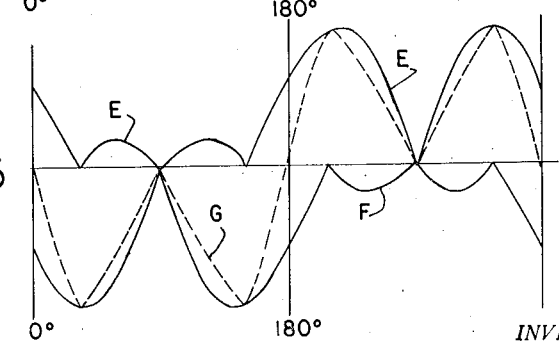

In accordance with the present invention the voltages obtained from the two antenna systems, and corresponding to the curves A and B, are periodically displaced in phase by one hundred and eighty degrees. This is obtained by operation of the motor driven switch 110. When this is accomplished by the switch the resultant of the curves A and B will appear as curve D in Fig. 14. In the visual signal channel portion of the receiver the full wave diode portion of the vacuum tube 478 responds to the resultant curves C and D to produce uni-directional current. If the curve D, for example, is rectified there will then appear a curve such as E. Uni-directional currents represented by the curve E, also shown in Fig. 15, are transmitted to one of the two capacitors 534 or 535 dependent upon the position of the switch contacts 115 or 116. It may be assumed that the direct currents corresponding to the curve E are supplied to the capacitor 534. When the alternating currents corresponding to the curve C of Fig. 13 are rectified they will produce uni-directional currents corresponding to the curve F of Fig. 15. These uni-directional currents are supplied to the capacitor 535. The two curves as represented in Fig. 15, therefore, portray the instantaneous voltage charges upon the capacitors 534 and 535 as related to the azimuth or angular displacement of the directional antenna system. The two capacitors are arranged in opposition and the zero center direct current instrument 539 responds to the resultant voltage of these two capacitors. The resultant voltage is therefore represented by the curve G. It therefore will be noted that at zero azimuth of the loop antenna system the resultant voltage is zero, so that the pointer of the indicating meter remains at the center.

The pointer of the zero center indicating instrument, in accordance with rotation of the loop antenna, therefore moves to one side of the zero point in accordance with the first half-wave loop of the curve G, and at some point intermediate zero and one hundred and eighty degrees again returns to zero. Thereupon, with further rotation of the antennas the second half-wave loop of the curve G is followed by the instrument and at one hundred and eighty degrees rotation of the antenna zero current is indicated and further rotation produces a movement of the indicator needle to the other side of zero to follow the third half-wave loop of the curve G, and again the meter may return to zero at an intermediate point between one hundred and eighty degrees and three hundred and sixty degrees or the initial zero position.

By referring back to Figs. 13 and 14 it will become apparent that the relative magnitudes of the voltages combined, or in other words the amplitudes of the curves A and B, may be varied considerably but the resultant curve C will always have a similar shape although of different magnitude. When the resultant voltages are translated into direct currents the curves E and F accordingly will vary to slightly change the resultant curve G in amplitude and in the shape of the half-wave loops. The cross-over points at zero and one hundred and eighty degrees, however, remain constant.

With certain ratios between the voltages represented by the curves A and B of Fig. 13, the resultant curve C when rectified may produce a resultant direct current curve such as G where, at the intermediate points between zero and one hundred and eighty degrees, and one hundred and eighty and three hundred and sixty degrees, the meter needle may not quite return to zero or may go slightly beyond zero and back again. Such deviations from the zero line of the representation in Fig. 15, however, are readily observable and the rate of change of the movement of the needle is different at these points than at the true and reciprocal null positions corresponding to zero and one hundred and eighty degrees.

Due to the opposed connection of the spaced loop antennas the greatest rate of change of indicator response per degree of loop antenna rotation occurs at the time when each loop antenna is responding to the maximum to the desired signal. At that time each loop antenna is in a plane parallel to the plane common to the radio transmitter and the radio receiver. In such position each of the loop antennas has a maximum response to vertically polarized waves, irrespective of the angle of elevation of the direction of travel of such waves, and each antenna has a minimum response to non-horizontally traveling horizontally polarized waves. Therefore, the antenna system thus provided is free from "night effect."

The ideal spacing between the spaced loop antennas is one which delivers the most rapid rise in indicator response per degree of loop antenna rotation, which would be one-quarter wave length for any particular signal frequency. At greater values of spacing the indicator response is less desirable. For any practical portable direction finding equipment covering a range of signal frequencies, the loop antenna system is a compromise in which the considerations are the receiver sensitivity at the various frequencies, noise level at various frequencies, and such practical considerations as the length of arm which can be readily transported. Because of these various considerations it has been found desirable in the present arrangement to provide a spacing between the loop antennas 101 and 102 which is in the order of one-quarter wave length, for the highest signal frequency to be received, and consequently this spacing value is a smaller fraction of a wave length for any lesser frequencies. Thus for all frequencies to be received there is obtained the more desirable response per degree of loop antenna rotation.

The radio receiver, the circuit of which is schematically shown in Figs. 1 to 6, is provided with a band switch mechanism which comprises a shaft having thereon numerous cams each arranged at various angular displacements to actuate certain switches shown in Figs. 1 to 6. Reference may now be had to Fig. 16 wherein there is shown a table indicating which switches are actuated in accordance with the rotation of the band switch mechanism to the various positions, which are ten in number. The first two positions cover the first part of the lower frequency range as, for example, from 2 to 3 megacycles. Position No. 1 conditions the receiver for the reception of narrow band modulated or continous wave signals, and position No. 2 conditions the receiver for the reception of wide band modulated signals, such as frequency modulated signals for which the receiver response characteristic is permitted a deviation of plus or minus 15 kilocycles. The band switch position No. 3, which covers from 3 to 4.5 megacycles, is provided for the reception of continuous wave and amplitude modulated signals similar to the operation in band switch No. 1. Band switch No. 4 broadens the response of the receiver to a deviation of plus or minus 15 kilocycles similar to the broadening obtained in band switch No. 2.

The higher frequency range is also divided into two frequency bands, the first being 20 to 31 megacycles and the second being 31 to 50 megacycles. Each band is provided with three switch positions, the first being for continuous wave and amplitude modulated signals, the second being for frequency modulated signals where a response of plus or minus 15 kilocycles is deemed adequate, and the third position is for frequency modulated signals where it is desired to have a response with a deviation of plus or minus 75 kilocycles. The second band similarly is provided with three different switch positions for three corresponding functional purposes.

The operation of the radio direction finder will be readily understood by assuming that the band switching apparatus is in position No. 1. In this position the switches S1, S5, S9, S13, S17, S21 and S34 are closed. Thus the spaced loop antennas 101 and 102 are connected through the periodically reversing switch 110 to the primary winding of the input transformer 121, the secondary winding of which is no longer short circuited and now is connected to the grid of the vacuum tube 128. The output of the vacuum tube 128 is impedance-capacitance coupled to the input of the succeeding radio frequency amplifier tube 201. The grid of the vacuum tube 201 is connected to the tuned impedance circuit comprising the impedance 152, the broadening resistor 159 and the trimming capacitor 162. The remaining tuned impedance circuits including the impedances 153 to 155 are each short circuited by their respective switches S10 to S12. The output of the radio frequency amplifier tube 201 is coupled to the input electrode of the vacuum tube 301 which is now connected through switch S13 to the tuned impedance circuit comprising the inductor 231, the broadening resistor 228, and the trimming capacitor 235. The oscillator section of the vacuum tube 301 is connected through the operation of the switches S17 and S21 so as to be associated with the inductors 212 and 213 which are bridged by a trimming capacitor 222. A gang tuning capacitor comprising the variable capacitors 131, 202, 239 and 246 are arranged to tune the input circuits associated with the vacuum tubes 128, 201 and 301, and simultaneously to tune the oscillator circuit associated with the vacuum tube 301. The first section of the gang tuning capacitor is provided with a vernier capacitor 132 in parallel with the tuning capacitor 131.

The vacuum tube 301 is followed by a plurality of stages of intermediate frequency amplification normally operating at 456 kilocycle frequency. Since the switches S25 to S30 have not been operated, the common intermediate frequency stages of amplification include the transformers 320, 340 and 440. The intermediate frequency amplifier section which is common to both channels of the radio receiver is followed in each channel by a stage of intermediate frequency amplification. The intermediate frequency amplifying tube 451 in the visual channel is followed by the transformer 479, the output of which is connected to the full wave diode rectifier portion of the vacuum tube 478. The direct current impulses produced by the diode portion of the vacuum tube 478 are in accordance with the radio frequency signal energy combined in the input circuit of the radio frequency amplifier tube 128. These direct current impulses are amplified by the direct current amplifier tube 518, the output of which is connected to the conductors 531 which are connected to the contacts of the switch contacts 115 and 116 of the motor driven switch 110. Alternately the switch contacts 115 and 116 are opened and closed so that the direct current impulses amplified by the tube 518 are alternately impressed upon the capacitors 534 and 535.

For example, it may be assumed that the input circuit for the vacuum tube 128 which has the switch S1 closed, has the contacts 111 and 113 of the switch 110 closed, and at the same time the contacts 116 are closed so that the direct current produced in accordance with the combined energy from the spaced loop antennas 101 and 102 with the sense loop antenna energy from the loop antenna 103 affects the capacitor 535. Upon further rotation of the switch 110 the contacts 116 will be opened. The opening of the contacts 116 is followed by the closing of the contacts 112 and 114 whereby the phase of the energy supplied by the spaced loop antennas 101 and 102 is reversed with respect to the previous combination of radio frequency energies. Subsequent to the closing of the switches 112 and 114 the switch contact 115 is closed so that direct current produced in accordance with the combined energy of the sense loop antenna 103 with the reversed phase energy obtained from the spaced loop antennas 101 and 102, is now impressed upon the capacitor 534. Subsequently the contact 115 is opened and this is followed by the opening of the contacts 112 and 114, at which time the contacts 111 and 113 are again closed. This periodic switching of the connections to the spaced loop antennas together with a concommitant switching of the indicator circuit which includes the zero-center direct current indicating instrument 539, produces a response indication which may be used to orient the directional antenna assembly so as to determine the null position thereof and hence determine the plane in which the receiver and the transmitter are located.

The oppositely connected capacitors 534 and 535 receive direct current impulses and the resultant energy charges on these capacitors is measured by the zero-center direct current indicating instrument 539. The operation of the switch contacts 115 and 116 is made to occur subsequent to and prior to the operation of the switch contacts 111 to 114 so as to insure correct indication in the indicating circuit and to avoid possible variations in the direct current voltages being produced due to the transient effects of the switching operation performed with respect to the radio frequency input circuit associated with the spaced loop antennas 101 and 102. Since the capacitors 534 and 535 are not being charged simultaneously, it becomes apparent that there would be momentary differences in the charges of these two capacitors, even though the radio frequency energies obtained at successive switch intervals by operation of the switch 110 were substantially equal. In order to obviate this condition, which of course would produce a wavering of the indicator needle of the zero-center direct current indicating instrument 539, there is provided a damping circuit arrangement which includes an alternating current electrolytic capacitor 536, which is shunted by the resistor 543. The sensitivity of the indication produced on the instrument 539 may be increased by closing the push button switch 546 to connect in parallel with the resistor 543 another resistor 544.

In order to assist in the tuning of the radio receiver the cathode circuit of the direct current amplifying tube 518 is provided with a tuning meter 521 which is energized by current, which is a direct function of the detector. The tuning of the radio receiver is finally adjusted by manipulations of the vernier capacitor 132 so as to produce a minimum reading on the tuning meter 521. The tuning meter 521 serves as a tuning indicator during that portion of the procedure in the operation of the radio direction finder when the receiver is initially tuned to a desired signal, which operation is performed prior to the energization of the direct current motor 118 which drives the motor driven switch 110.

The intermediate frequency amplifier which is common to both signal channels also supplies energy to the vacuum tube 601 in the audio channel which is interconnected with the vacuum tube 619 by an intermediate frequency transformer 620. Since the switches S37 to S43 have not been actuated but are in the position shown in the circuit diagram in Fig. 6, the vacuum tube 601 operates as an intermediate frequency amplifying tube, and the vacuum tube 619 operates as a detector for amplitude modulated or continuous wave signals. Head phones are attached to the voice jack by a suitable plug so that the desired station signal may be audibly identified. The operation of the receiver thus far described is the one which takes place when amplitude modulated signals are to be received.

If continuous wave signals are to be received the oscillator section of the vacuum tube 478 which comprises the triode portion thereof is placed into operation. It will be recalled that switch S34 has been actuated by the main band switch mechanism so that the tuned circuit comprising the inductor 507 and the capacitor 508 are no longer short circuited. Plate potential is, however, not being supplied to the vacuum tube 478 until the tuning capacitor 502 has its rotor moved from its extreme counterclockwise position. When the rotor is initially moved from its counterclockwise position, the switch 503 is closed whereby power supplied by the power conductor 134 is applied to the anode circuit of the vacuum tube 478 whereupon the triode section of this vacuum tube will generate oscillations the frequency of which may be varied so that the desired continuous wave signals may be received and identified over the audible signal channel portion of the direction finder.

When a portable direction finder of the type incorporating the circuit herein disclosed is set up for operation, the directional antenna system is first oriented with respect to magnetic North by a compass arranged to be attached by means of an arm to the rotatable loop antenna structure. When this has been done an azimuth scale provided for cooperation with the rotatable antenna structure is adjusted so as to be oriented with respect to the position of the antenna with respect to North. The next step consists of momentarily energizing the motor 118 by closing the switch 584 and then observing as to whether or not radio frequency energy is being impressed upon the receiver by the stopping of the switch 110 in a position where either of the sets of contacts 111 and 113 or 112 and 114 is closed. When this condition has been obtained the sense loop gain control 139 is adjusted to its maximum point. The radio frequency gain control which is obtained by adjustment of the resistor 143 is adjusted to provide a predetermined indication on the tuning meter 521. The trimming capacitor or vernier capacitor 132 is then adjusted for a minimum indication of the tuning meter 521. If continuous wave reception is to be had the capacitor 502 is actuated. In order to avoid overloading effects and consequent mistuning the radio frequency gain control is adjusted so that the indication on the tuning meter never reaches a value less than a certain predetermined amount.

After the desired signal has been obtained by the operation just described, which included the adjustment of the gang tuning capacitors including the capacitor sections 131, 202, 239 and 246, the motor on-off switch 584 is closed. The direction finding antenna system is then rotated until the direction finding indicating meter 539 has a reading just slightly off from zero. The sense loop antenna gain control is then adjusted to give maximum deflection of the direction finding meter 539. Next the radio frequency gain control obtained by the resistor 143 is adjusted to give another maximum meter deflection of the direction finding meter 539. The vernier capacitor 132, and if necessary the main tuning capacitor, is adjusted to give the maximum deflection on the direction finding meter 539. The direction loop antenna system is then rotated to determine when the direction finding meter indicator needle moves from one side of the zero center point through zero and beyond. Such indication, which is fairly rapid with respect to a steady rotation of the loop antennas, is an indication of the null position of the antennas. The correct azimuth indication of the antenna structure may now be obtained by returning the loop antennas so as to obtain a zero reading on the direction finding meter 539. At this point it may be desirable to increase the sensitivity of the meter 539 by closing the switch 546 so that the null position may be determined with considerable accuracy.

It may now be assumed that it is desired to receive frequency modulated signals in the frequency band from 2 to 3 megacycles. The operator therefore will throw the band switch to position No. 2 and follow the general procedure of operation of the receiver which corresponds to the manner in which the receiver is previously operated in order to receive amplitude modulated or continuous wave signals. In other words, the first steps after selecting the frequency band include the step of tuning the receiver, which is done without the operation of the motor driven switch 110, and subsequently when tuning has been completed the switch is placed into operation in order to produce a visual indication on the meter 539 to determine the null position of the rotatable loop antenna system. In order to receive frequency modulated signals in the 2 to 3 megacycle band a number of circuit changes are required. Since continuous wave signals are not being received the switch S34 is not actuated. In order that the intermediate frequency amplifier have a response characteristic broad enough to transmit the wide band modulated signals, the response characteristic is broadened sufficiently to provide a deviation of plus or minus 15 kilocycles. This is obtained by the operation of the switches S44 to S51 so that resistors are connected in parallel with the primary and secondary windings of each of the intermediate frequency transformers 320, 340, 440 and 470. It, furthermore, is desired to provide an increase in the intermediate frequency amplifier gain with this broadened response characteristic, and this is accomplished by the operation of the switch S52 which short circuits the biasing resistor 454, thereby to decrease the bias applied to the vacuum tubes 326, 426 and 451. Each of these tubes, therefore, is then self-biased by its respective resistor, such as the resistors 328, 428 and 453.

In the audible signal channel the switches S42 and S43 are actuated so that the operation of the vacuum tube 601 is changed from the intermediate frequency amplifier to a frequency modulation limiter. The switch S43 connects the cathode of the vacuum tube 601 directly to ground, thereby removing from the grid-cathode circuit of this vacuum tube the bias heretofore applied by the self-biasing resistor 603 and the common biasing resistor 454. The screen grid voltage of the vacuum tube 601 is also altered by the variation of the switch S42 which now connects the screen grid in a voltage divider circuit extending from the high voltage conductor 134 to ground. This voltage divider circuit now comprises the resistors 604, 615 and 617. These changes in the cathode and screen grid voltages thereby cause the vacuum tube 601 to operate as a limiter for the reception of frequency modulated signals.

The operation of the vacuum tube 619 is also changed from the operation of a detector for amplitude modulated and continuous wave signals to a frequency modulation discriminator by the operation of the switches S40 and S41. Prior to the operation of the switch S41 both cathodes of the vacuum tube 619 were directly connected to ground, and the midpoint on the transformer 622, prior to the operation of the switch S40, was connected to the input circuit of the audio amplifier tube 643. Upon operation of the switch S41 one cathode of the vacuum tube 619 is now connected to the resistance-capacitance filter circuit which precedes the input circuit to the audio amplifier tube 643. This same cathode of the vacuum tube 619 also has a circuit to ground through the resistors 626 and 625, each of which is bridged by capacitors 628 and 627, respectively. The other cathode of the vacuum tube 619 remains directly connected to ground so that there is now a difference of potential between the two cathodes of the vacuum tube 619. The operation of the switch S40 now connects the midpoint of the intermediate frequency transformer winding 622 to the conductor 631 which is connected to a resistor 629 having a connection to the common juncture between the biasing resistors 625 and 626. With such changes being made with respect to the cathodes of the vacuum tube 619 the operation now corresponds to well known frequency discriminator circuit operation.

It will now be assumed that the next operation is to occur in the band from 3 to 4.5 megacycles for the reception of either amplitude modulated or continuous wave signals. This operation now restores switches S1, S5, S9, S13, S17 and S21 to the condition where the secondary winding of the transformer 121 is again short circuited, choke coils 152 and 231 are each short circuited, a portion of the resonant circuit including the choke coils 213 and 212 is short circuited, and in place of the switched out circuits the switches S2, S6, S10, S14, S18 and S22 have become effective to connect in other resonant circuits. The operation of the switch S2 therefore connects the primary winding of the transformer 122 to the conductors 130 and 140, and the secondary winding thereof is connected by the switch S6 to the conductor 127 which is connected to the grid of the radio frequency amplifying tube 128. The switch S10 connects into circuit a resonant circuit comprising an inductor 153, a capacitor 163, and a resistor 161. The operation of the switch S14 connects into circuit a resonant circuit comprising an inductor 232, a capacitor 236, and a resistor 229. The operation of the switches S18 and S22 connect into circuit a resonant circuit including inductors 214 and 215 and capacitors 223 and 227. The switch S34 is actuated so that the oscillator section of the vacuum tube 478 may be caused to generate oscillations for the reception of continuous wave signals. The operation of the switches S2, S6, S10, S14, S18 and S22 therefore has changed the resonant circuits associated with the radio frequency amplifier and with the oscillator section of the first detector and oscillator.

By shifting from band switch position No. 2 to No. 3 the operation of the vacuum tubes 601 and 619 was again restored to the operation corresponding to an intermediate frequency amplifier and a detector suitable for operation with amplitude modulated or continuous wave signals. If now a shift is made from amplitude modulated signal reception to frequency modulated signal reception, the switch S34 is restored and switches S40 to S52 are actuated so that the response of the intermediate frequency amplifier is again broadened in a manner corresponding to the broadening occurring when the band switch was in position No. 2. At the same time the operation of the vacuum tubes 601 and 619 was shifted from operation as an intermediate frequency amplifier and as a detector to a frequency modulation limiter and a frequency modulation discriminator.

In the fifth band position the receiver is conditioned for operation in the frequency band from 20 to 31 megacycles and for the reception of amplitude modulated or continuous wave signals. The radio frequency amplifier and the first detector oscillator section are each provided with new resonant circuit apparatus. In the two higher frequency ranges the resonant circuits associated with the oscillator portion of the first detector 301 are connected directly to the grid circuit coupling capacitor 248, whereas in the lower frequency band operation corresponding to band switch positions No. 1 to No. 4 each of the resonant circuits included its own individual padding capacitor, such as the capacitor 226 or capacitor 227. Either of these capacitors 226 or 227, furthermore, with respect to the grid of the vacuum tube 301 is connected through both the capacitors 243 and 248. In each of the higher frequency band positions, such as positions No. 5 to No. 10, it is possible to operate the intermediate frequency amplifier at a higher gain level so that for each of these band switches the switch S52 is actuated. Thus in position No. 5 of the band switch the bias applied to the vacuum tubes 326, 426, 451, and also 601, has been reduced as compared to the operation of these tubes in band switch positions No. 1 and No. 3. In order that continuous wave signals may be received in the higher frequency range, both switches S35 and S36 are actuated so as to connect to the triode portion of the vacuum tube 478 the resonant circuit comprising the inductor 509 and the capacitor 511. These two switches are also operated for the reception of amplitude modulated signals in band switch position No. 8 where the frequency range is 31 to 50 megacycles.

It may now be assumed that the receiver is to be operated in band switch position No. 6 for the reception of frequency modulation signals wherein it is deemed that a response characteristic of plus or minus 15 kilocycles is adequate. Under such operation the switches S44 to S51 are not operated and hence the intermediate frequency amplifier, which now is operating at the higher intermediate frequency of 5000 kilocycles, which uses the intermediate frequency transformers 310, 330, 430, 460 and 619, does not require further broadening of the response characteristic by the switching in of the broadening resistors which comprise the resistors 315, 325, 346, 347, 446, 447, 476 and 477. When, however, a response characteristic requiring a deviation of plus or minus 75 kilocycles is desired, the band switch is thrown to position No. 7 wherein the positions of all of the switches remain the same with the exception of the addition of the actuated switches S44 to S51 so that now the broadening resistors are connected in parallel with the primary and secondary windings of the transformers 310, 330, 430 and 460.

In the band switch positions No. 8 to No. 10, the switches S4, S8, S12, S16, S20 and S24 change the resonant circuits of the radio frequency amplifier and the oscillator circuit of the first detector to accommodate reception in the band from 31 to 50 megacycles. The operation of the other switches S25, S33, and S37 to S39, inclusive, remains the same as for band switch positions No. 5 to No. 7. In band switch position No. 5 switches S35 and S36 are actuated to provide for the oscillator operation of the triode portion of vacuum tube 478 so that continuous wave signals may be received. The operation of the other switches for the band positions No. 9 and No. 10, to provide frequency modulation reception under either the 15 kilocycle or 75 kilocycle deviation, corresponds to the operation occurring in band switch positions No. 6 and No. 7 respectively.

The circuit arrangement of the superheterodyne radio receiver having facilities for receiving amplitude modulated, frequency modulated and continuous wave signals whereby the intermediate frequency amplifier may be selectively operated at two different intermediate frequencies and whereby the response characteristics of the receiver are broadened at either of the intermediate frequencies is claimed in a copending divisional application Serial No. 619,407, filed September 29, 1945.

What is claimed is:

1. In a radio direction finder utilizing a plurality of loop antennas the method comprising receiving energy with a pair of loop antennas in spaced apart parallel planes, differentially combining energy received by said antennas to produce a resultant voltage, receiving energy from another loop spaced between and parallel to said first loops to produce a voltage, combining said resultant voltage with said latter voltage, periodically reversing the phase of one of the voltages so combined, amplifying said combined voltages, deriving from said amplified voltages direct currents proportional thereto, comparing the direct currents derived from said two different combined amplified voltages, and producing an indication in accordance with said compared voltages.

2. In a radio direction finder the method of reducing night effect and ninety degree ambiguities comprising receiving energy by a plurality of loop antennas arranged in spaced parallel planes, differentially combining voltages derived from two of said loop antennas to produce a resultant voltage, deriving another voltage from a loop antenna midway between and parallel to said other antennas, combining said resultant voltage with said latter voltage, periodically reversing the phase of one of said voltages so combined, producing direct current voltages proportional to said combined voltages, differentially combining said direct current voltages and producing an indication in accordance with the resultant direct current voltage.

3. In a radio direction finder having a zero center direct current indicating instrument, the method of producing a reversal of a flow of current through said indicating instrument only at the null positions of a directive radio receiving antenna comprising receiving radiant energy by means of three loop antennas respectively arranged in three parallel planes, the two outer parallel planes being arranged equidistantly from the intermediate plane, differentially combining voltages obtained from the two outer antennas respectively arranged in the two outer planes to produce a resultant voltage, combining said resultant voltage with a voltage derived from the intermediate antenna arranged in the intermediate plane, controlling the ratio of the voltages so combined, periodically reversing the phase of one of the voltages so combined, deriving direct current voltages proportional to said combined voltages, differentially comparing said direct current voltages to produce a resultant voltage, and applying said resultant voltage to said indicating instrument.

4. In a radio direction finder having three loop antennas respectively arranged in three parallel planes, the two outer planes being arranged equidistantly from the intermediate plane, and a zero center direct current indicating instrument, the method comprising differentially combining energy obtained from the two outer antennas respectively arranged in the two outer planes to produce a resultant voltage, combining said resultant voltage with a voltage derived from the intermediate antenna arranged in the intermediate plane, periodically reversing the phase of one of the voltages so combined, deriving direct current energies proportional to said combined voltages, storing said direct current energies, differentially combining said stored direct current energies and energizing said indicator with the resultant direct current voltage to produce an indication.

5. A direction finding radio receiver comprising a pair of spaced loop antennas, a third loop antenna, a plurality of input transformers each adapted to be energized selectively by said pair of loop antennas, each transformer being provided with means for maintaining said pair of loop antennas electrostatically balanced with respect to ground, a vacuum tube arranged to be energized from a selective one of said transformers, means for variably tuning the selected one of said transformers, a resistive termination for balancing said third antenna with respect to ground, a vacuum tube having an aperiodic input circuit energized from said resistive termination, and an impedance-capacitance coupled output circuit for said vacuum tube, said output circuit being capacitively coupled to said tuning means.

6. A direction finding radio receiver comprising a pair of spaced loop antennas, a third loop antenna positioned midway between said first antennas, a plurality of input transformers each adapted to be energized selectively by said pair of loop antennas, each transformer being provided with means for maintaining said pair of loop antennas electrostatically balanced with respect to ground, a vacuum tube arranged to be energized from a selected one of said transformers, means for variably tuning the secondary winding of the selected one of said transformers, an aperiodic termination arranged to maintain balance of said third antenna with respect to ground, a vacuum tube having an input circuit energized from said aperiodic termination, an impedance choke for the plate circuit of said vacuum tube, and means for capacitively coupling the plate of said vacuum tube to the input grid of said first mentioned vacuum tube.

7. A radio direction finder comprising a pair of spaced parallel loop antennas, a third loop antenna positioned parallel to and midway between said pair of spaced parallel loop antennas, means for periodically combining the energies received by said loop antennas and for producing direct current proportional to said combined energies, means for periodically combining the energies received by said loop antennas with the phase reversed with respect to said previous combination of energies and for producing direct current proportional to said latter combined energies, and means for indicating the difference in said direct currents.

8. A radio direction finder comprising a pair of spaced parallel loop antennas, a third loop antenna positioned parallel to and midway between said pair of spaced parallel loop antennas, means for periodically combining the energies received by said loop antennas and for producing direct current proportional to said combined energies, means for periodically combining the energies received by said loop antennas with the phase reversed with respect to said previous combination of energies and for producing direct current proportional to said latter combined energies, means for comparing said direct currents, and means for indicating the magnitude and direction of current produced as a result of said comparison.

9. A radio direction finder comprising a pair of opposed parallel spaced loop antennas, a third loop antenna positioned parallel to and midway between said loop antennas, a radio receiver connected to said latter loop antenna and adapted to be energized by said first loop antennas, switching means for periodically reversing the connection between said first loop antennas and said receiver, said receiver including means for deriving uni-directional potentials dependent upon the magnitude of the signals supplied by said first loop antennas, an indicator circuit including two capacitors and means for indicating a voltage difference between electric charges on said capacitors, and switching means operating concomitantly with said first switching means for alternately connecting said capacitors to said means for deriving uni-directional potentials thereby to charge said capacitors.

10. In a radio direction finder the method comprising receiving radiant energy by three loop antennas respectively arranged in three parallel planes, the two outer planes being arranged equidistantly from the intermediate plane, differentially combining energies received in the two outer antennas respectively arranged in the two outer planes to produce a resultant voltage, combining said resultant voltage with a voltage derived from the intermediate antenna arranged in the intermediate plane, periodically reversing the phase of one of said voltages relative to the other, amplifying said combined voltages, deriving from said amplified voltages direct current voltages proportional thereto, comparing the direct current voltages derived from said two different combined amplified voltages, and producing an indication in accordance with said compared voltages.

11. In a radio direction finder the method comprising receiving radiant energy by three loop antennas respectively arranged in three parallel planes, the two outer planes being arranged equidistantly from the intermediate plane, differentially combining energies received in the two outer antennas respectively arranged in the two outer planes to produce a resultant voltage, combining said resultant voltage with a voltage derived from the intermediate antenna arranged in the intermediate plane, periodically reversing the phase of one of said voltages relative to the other, amplifying said combined voltages, deriving from said amplified voltages direct current voltages proportional thereto, differentially combining the direct current voltages derived from said two different combined amplified voltages, and producing an indication in accordance with the resultant differential voltage.

12. In a radio direction finder the method comprising receiving energy by three loop antennas respectively arranged in three parallel planes, the two outer planes being equally spaced from the intermediate plane, differentially combining energies received in the two outer antennas respectively arranged in the two outer planes to produce a resultant voltage, combining said resultant voltage with a voltage obtained from the intermediate antenna arranged in the intermediate plane, controlling the ratio of the voltages so combined, periodically reversing the phase of one of the voltages so combined, deriving from said combined voltages direct current voltages proportional thereto, differentially comparing the direct current voltages derived from said two different combined voltages, and producing an indication in accordance with the resultant differential direct current voltage.

13. In a radio direction finder the method comprising receiving radiant energy by three loop antennas respectively arranged in three parallel planes, the two outer parallel planes being arranged equidistantly from the intermediate plane by a distance generally less than one-eighth of the wave length of the energy to be received, differentially comparing voltages obtained from the two outer antennas respectively arranged in the two outer planes to produce a resultant voltage independently of night effect, combining said resultant voltage with a voltage derived from the intermediate antenna arranged in the intermediate plane to obviate ninety degree ambiguities, controlling the ratio of the voltages so combined, periodically reversing the phase of one of the voltages so combined, amplifying said combined voltages, deriving direct current voltages proportional to said combined voltages, differentially comparing said direct current voltages to produce a resultant voltage, and producing an indication in accordance with said resultant voltage.

14. The combination comprising a rotatable directional antenna, a superheterodyne radio receiver connected thereto for the selective reception of continuous wave, amplitude modulated or frequency modulated radio energy, said radio receiver including an intermediate frequency amplifier, a channel for selectively translating said radio frequency energy into audible signals, said channel comprising a stage of intermediate frequency amplification convertible into a frequency modulation limiter, and a detector convertible into a frequency modulation discriminator, means for converting said stage of intermediate frequency amplification into said frequency modulation limiter and for converting said detector into said frequency modulation discriminator, a channel for translating radio frequency energy into visual indications, and means for coupling said intermediate frequency amplifier to both said channels.

15. The combination comprising a rotatable directional antenna, a superheterodyne radio receiver connected thereto and arranged for the selective reception of continuous wave radio signals and amplitude modulated wave radio signals and frequency modulated wave radio signals, means for selectively setting said radio receiver for the reception of any one of said types of radio signals, said radio receiver including an intermediate frequency amplifier, a channel for translating receiver radio signals into audible signals, a channel for translating received radio signals into visual indications, and means for coupling said intermediate frequency amplifier to both said channels.

16. A direction finding radio receiver comprising a pair of spaced loop antennas, a third loop antenna positioned between said first antennas, a plurality of input transformers each adapted to be energized selectively by said pair of loop antennas, each transformer being provided with means for maintaining said pair of loop antennas electrostatically balanced with respect to ground, a vacuum tube arranged to be energized from a selected one of said transformers, means for variably tuning the secondary winding of the selected one of said transformers, an aperiodic circuit for terminating said third antenna and for maintaining an electrostatic balance between said third antenna and ground, a vacuum tube energized from said aperiodic circuit, an impedance choke for the plate circuit of said vacuum tube, and means for capacitively coupling the plate of said vacuum tube to the input grid of said first mentioned vacuum tube.

17. A radio direction finder comprising a pair of spaced loop antennas, a third loop antenna positioned between said pair of antennas, a radio receiver, a first circuit interconnecting said pair of antennas and said receiver, a second circuit interconnecting said third antenna and said receiver, means for periodically reversing said first circuit, means in said receiver for combining energies received from said antennas whereby the energy received from said third antenna is combined with the energy received from said pair of antennas upon each reversal of said first circuit, means for producing direct current voltage pulses proportional to each of said combinations of energies, a visual indicator, a pair of circuits for said indicator, and means for transmitting each odd numbered pulse of direct current to one circuit of said last-mentioned pair and for transmitting each even numbered pulse of direct current to the other circuit of said last-mentioned pair.

18. A radio direction finder comprising a pair of spaced loop antennas, a third loop antenna positioned between said pair of antennas, a radio receiver, a first circuit interconnecting said pair of antennas and said receiver, a second circuit interconnecting said third antenna and said receiver, means for periodically reversing said first circuit, means in said receiver for combining energies received from said antennas whereby the energy received from said third antenna is combined with the energy received upon each reversal of said circuit, means for producing direct current voltage pulses proportional to each of said combinations of energies, a visual indicator, a pair of circuits for said indicator, means for transmitting each odd numbered pulse of direct current to one circuit of said last-mentioned pair and for transmitting each even numbered pulse of direct current to the other circuit of said last-mentioned pair, and means included in said pair of circuits for comparing the magnitude of said pulses and for causing said indicator to indicate the difference in magnitude.

19. In a direction finder, a rotatable antenna system comprising a pair of spaced loop antennas and a third loop antenna positioned between said pair of antennas, a radio receiver terminating said antennas and energized thereby, means for periodically reversing the phase of the energy received from said pair of antennas, means for combining the energy received from said third antenna with the energies received from said pair of antennas upon each of said reversals, means for demodulating said combined energies, a vacuum tube energized from said demodulated energies, a first indicator controlled by said vacuum tube for indicating the tuning condition of said receiver, and a second indicator controlled by said vacuum tube for indicating when a null point is reached during the rotation of said antenna system.

20. In a direction finder, a rotatable antenna system comprising a pair of spaced loop antennas and a third loop antenna positioned between said pair of antennas, a radio receiver terminating said antennas and energized thereby, means for periodically reversing the phase of the energy received from said pair of antennas, means for combining the energy received from said third antenna with the energies received from said pair of antennas upon each of said reversals, means for demodulating said combined energies, a vacuum tube energized from said demodulated energies, a first indicator, a first circuit network controlled by said vacuum tube for causing said first indicator to indicate the maximum signal strength received by said radio direction finder, a second indicator, a second circuit network for said second indicator, said second circuit network controlled by said vacuum tube for causing said second indicator to indicate when a null point is reached during the rotation of said antenna system, and manually controlled means individually associated with said first and said second circuit networks for selectively altering the sensitivity of said first or said second indicator.

21. In a radio direction finder, a rotatable antenna system comprising a pair of spaced loop antennas and a third loop antenna positioned between said pair of antennas, a radio receiver connected to said antennas and adapted to be energized by signals received by said antennas, switching means for periodically reversing the connection between said pair of loop antennas and said receiver, means in said receiver for combining a signal received by said third antenna with a signal received by said pair of loop antennas upon each of said reversals, means in said receiver for demodulating said combined signals, a vacuum tube energized by said demodulated signals, a first and a second indicator, a circuit controlled by said tube for causing said first indicator to indicate when said receiver is tuned in accordance with the maximum signal strength of a received signal, a second circuit including a pair of capacitors, and means including said tube for alternately charging said capacitors each time said switching means reverses the said connection of said pair of loop antennas whereby said second indicator is controlled in accordance with the difference between the charges on said capacitors to indicate when a null point is reached in a signal received during rotation of said antenna system.

ROSWELL H. HERRICK.

REFERENCES CITED

The following references are of record in the file of this patent:

UNITED STATES PATENTS

| Number | Name | Date |
|---|---|---|
| 2,089,956 | Harding | Aug. 17, 1937 |
| 2,166,991 | Guanella | July 25, 1939 |
| 2,170,852 | Chireix | Aug. 29, 1939 |
| 2,218,361 | Runge et al. | Oct. 15, 1940 |
| 2,223,066 | Hahnemann | Nov. 26, 1940 |
| 2,282,402 | Hefele | May 12, 1942 |
| 2,282,971 | Koch | May 12, 1942 |
| 2,297,249 | Runge | Sept. 29, 1942 |
| 2,329,199 | Hefele | Sept. 14, 1943 |
| 2,407,323 | O'Brien | Sept. 10, 1946 |